US011200133B1

(12) United States Patent
A et al.

(10) Patent No.: US 11,200,133 B1
(45) Date of Patent: Dec. 14, 2021

(54) INTELLIGENT DEVICE ROLE DISCOVERY

(71) Applicant: Juniper Networks, Inc., Sunnyvale, CA (US)

(72) Inventors: Chandrasekhar A, Bangalore (IN); Nirmal Anburose, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 102 days.

(21) Appl. No.: 16/731,935

(22) Filed: Dec. 31, 2019

Related U.S. Application Data

(62) Division of application No. 15/475,942, filed on Mar. 31, 2017, now Pat. No. 10,558,542.

(51) Int. Cl.
*H04L 12/24* (2006.01)
*G06F 11/30* (2006.01)
*G06N 20/00* (2019.01)
*H04L 12/26* (2006.01)

(52) U.S. Cl.
CPC ...... *G06F 11/3051* (2013.01); *G06F 11/3006* (2013.01); *G06F 11/3013* (2013.01); *G06N 20/00* (2019.01); *H04L 41/12* (2013.01); *H04L 43/0811* (2013.01)

(58) Field of Classification Search
CPC ............. G06F 11/3051; G06F 11/3013; G06F 11/3006; H04L 43/0811; H04L 41/12
USPC .......................................................... 709/224
See application file for complete search history.

(56) References Cited

U.S. PATENT DOCUMENTS 7,062,546 B1 6/2006 Kolar et al.
7,457,853 B1 11/2008 Chari et al.
7,483,965 B1 1/2009 Gerraty
8,156,213 B1 4/2012 Deng et al.
8,533,303 B2 9/2013 Wikström
9,253,034 B1 2/2016 Krishnamurthy et al.
10,148,506 B1 12/2018 Anburose et al.
10,200,248 B1 2/2019 Jiang et al.
10,228,931 B2 * 3/2019 Singh .................... G06N 3/006
10,230,585 B1 3/2019 A et al.

(Continued)

OTHER PUBLICATIONS

Notice of Allowance from U.S. Appl. No. 15/476,010, dated Dec. 4, 2019, 7 pp.

(Continued)

*Primary Examiner* — Tu T Nguyen

(74) *Attorney, Agent, or Firm* — Shumaker & Sieffert, P.A.

(57) ABSTRACT

In one example, a network management system (NMS) and method discovers device roles for network devices. The NMS includes a learning module configured to include a learning model, the learning model trained to associate configuration segments for each of a plurality of network devices with device roles performed by the network devices. The NMS discovers a network service on a network, receives configuration information from the discovered network service and splits the configuration information received from the discovered network service into configuration segments based on a vendor neutral yang model associated with the discovered network service. The NMS then determines if the discovered network service performs one or more of the device roles performed by the network devices used to train the learning model, wherein determining includes applying the learning model to the configuration segments of the discovered network service.

20 Claims, 18 Drawing Sheets

(56) References Cited

U.S. PATENT DOCUMENTS

| | | | |
|---|---|---|---|
| 10,700,962 | B2 * | 6/2020 | Karthikeyan ......... H04L 45/308 |
| 2007/0100712 | A1 | 5/2007 | Kilpatrick et al. |
| 2008/0025231 | A1 | 1/2008 | Sharma et al. |
| 2008/0222730 | A1 | 9/2008 | Ford et al. |
| 2013/0216037 | A1 | 8/2013 | Eicholz et al. |
| 2013/0332399 | A1 | 12/2013 | Reddy et al. |
| 2015/0379121 | A1 | 12/2015 | Akolkar et al. |
| 2015/0379429 | A1 | 12/2015 | Lee et al. |
| 2016/0028616 | A1 | 1/2016 | Vasseur et al. |
| 2016/0261615 | A1 | 9/2016 | Sonnenberg et al. |
| 2016/0350095 | A1 | 12/2016 | Ramachandran et al. |
| 2016/0359680 | A1 | 12/2016 | Parandehgheibi et al. |
| 2017/0078170 | A1 * | 3/2017 | Vasseur .................. G06N 20/00 |
| 2017/0171102 | A1 | 6/2017 | Parker et al. |
| 2018/0096260 | A1 | 4/2018 | Zimmer et al. |
| 2020/0084522 | A1 | 3/2020 | Mirsky |

OTHER PUBLICATIONS

Office Action from U.S. Appl. No. 15/475,875, dated Feb. 3, 2020, 45 pp.
"Model-Driven Network Management Framework," Tail-F Network Control System (NCS), Nov. 2013, 3 pp.
"Multilayer Perceptron," Wikipedia, The Free Encyclopedia, accessed on Oct. 25, 2016, from https://en.wikipedia.org/wiki/Multilayer_perceptron, 4 pp.
"Recurrent Layers," Keras Documentation, (DATE), accessed from http://keras.io/layers/recurrent/, 6 pp. No Date.
"Soflmnax Function," Wikipedia, The Free Encyclopedia, accessed on Oct. 25, 2016, from https://en.wikipedia.org/wiki/Softmax_function, 3 pp.
"Stochastic gradient descent," Wikipedia, The Free Encyclopedia, accessed on Oct. 25, 2016, from https://en.wikipedia.org/wiki/Stochastic_gradient_descent, 8 pp.
Amendment in Response to Office Action dated Mar. 7, 2019, from U.S. Appl. No. 15/476,010, filed Jun. 7, 2019, 12 pp.
Bjorklund, "YANG—A Data Modeling Language for the Network Configuration Protocol (NETCONF)," RFC 6020, Internet Engineering Task Force (IETF), Oct. 2010, 173 pp.
Bray et al., "Extensible Markup Language (XML) 1.0 (Fifth Edition)," W3C Recommendation, Nov. 26, 2008, 26 pp.
Cho, "Understanding Dropout: Training Multi-Layer Perceptrons with Auxiliary Independent Stochastic Neurons," arXiv: 1306.2801v4, ICONIP 2013: Special Session in Deep Learning, Aug. 18, 2013, 9 pp.
Enns, "NETCONF Configuration Protocol," RFC 4741, Network Working Group, the Internet Engineering Task Force, Dec. 2006, 95 pp.
Harrington et al., "An Architecture for Describing Simple Network Management Protocol (SNMP) Management Frameworks," RFC 3411, Network Working Group, the Internet Engineering Task Force draft, Dec. 2002, 64 pp.
Nguyen et al., "OSPF Out-of-Band LSDB resynchronization draft-nguyen-ospf-oob-resync-06.txt," Network Working Group, Internet Draft, Oct. 26, 2006, 16 pp.
Notice of Allowance from U.S. Appl. No. 15/476,010, dated Jul. 12, 2019, 7 pp.
Office Action from U.S. Appl. No. 15/476,010, dated Mar. 7, 2019, 9 pp.
Srivastava et al., "Dropout: A Simple Way to Prevent Neural Networks from Overfitting," Journal of Machine Learning Research 15, Jun. 2014, pp. 1929-1958.
Sutskever et al., "Sequence to Sequence Learning with Neural Networks," arXiv:1409.3215v3, Google, Dec. 14, 2014, 9 pp.
Thang et al., "XML Schema Automatic Matching Solution," International Journal of Electrical, Computer, and Systems Engineering 4:1, 2010, 7 pp.
Thompson et al., "XML Scheme Part 1: Structures Second Edition," W3C Recommendation 28, Oct. 2004, 76 pp.
U.S. Appl. No. 15/475,875, by Juniper Networks, Inc. (Inventors: Chandrasekhar et al.), filed on Mar. 31, 2017.
U.S. Appl. No. 15/476,010, by Juniper Networks, Inc. (Inventors: Chandrasekhar et al.), filed on Mar. 31, 2017.
Zerdazi et al., "Computing Path Similarity relevant to XML Schema Matching," On the Move to Meaningful Internet Systems: OTM 2008 Workshops, Lecture Notes in Computer Science, vol. 5333, Nov. 9-14, 2008, 10 pp.
Zhang et al., "Simple Fast Algorithms for the Editing Distance Between Trees and Related Problems," Society for Industrial and Applied Mathematics, vol. 18, No. 6, Dec. 1989, pp. 1245-1262.
Prosecution History of parent U.S. Appl. No. 15/475,942, dated Aug. 8, 2019 through Oct. 29, 2019 20 pp.
Response to Office Action dated Feb. 3, 2020 from U.S. Appl. No. 15/475,875, filed Apr. 30, 2020, 6 pp.
Office Action from U.S. Appl. No. 15/475,875, dated Jul. 7, 2020, 50 pp.
Response to Office Action dated Jul. 7, 2020 from U.S. Appl. No. 15/475,875, dated Oct. 7, 2020, 11 pp.
Final Office Action from U.S. Appl. No. 15/475,875, dated Jan. 19, 2021, 47 pp.
Response to Final Office Action dated Jan. 19, 2021 from U.S. Appl. No. 15/475,875, dated Mar. 19, 2021, 14 pp.
Response to Final Office Action dated Jan. 19, 2021 from U.S. Appl. No. 15/475,875, dated Apr. 19, 2021, 10 pp.

* cited by examiner

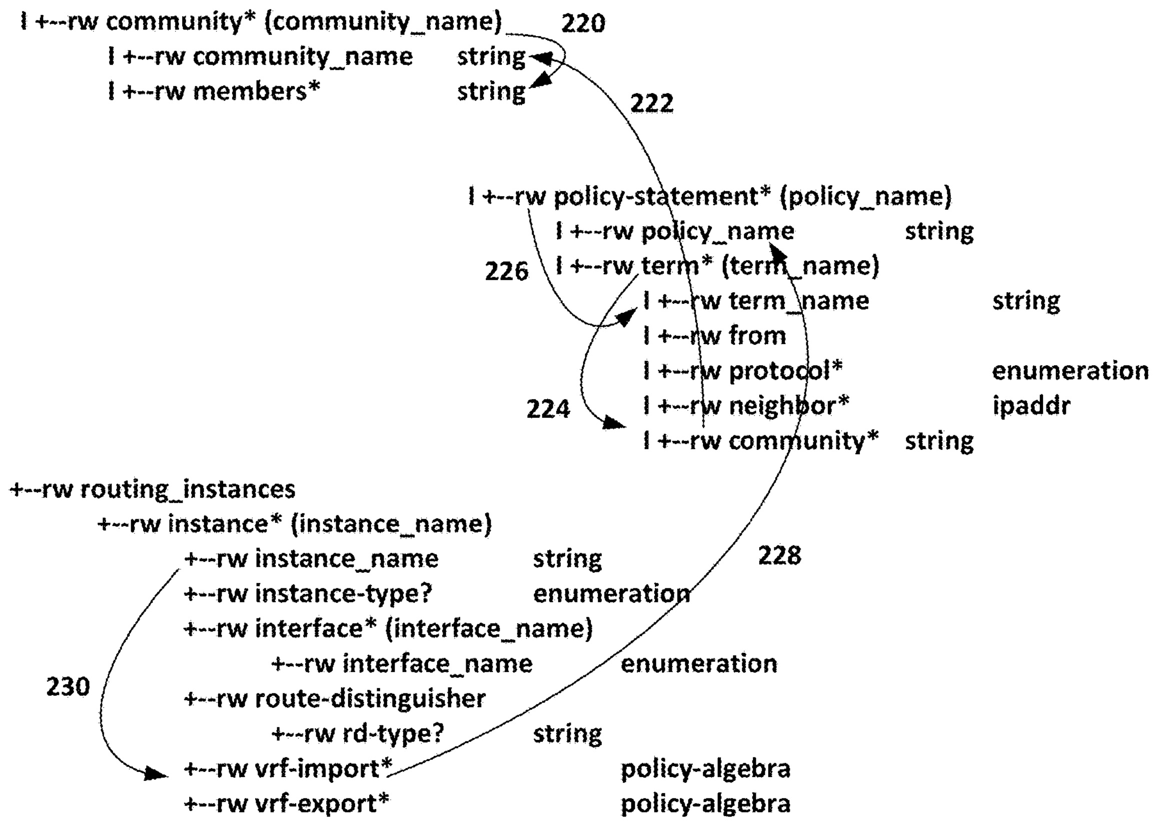

220 -> 'members' are located in community list. 'community-name' is also part of the mapping. members are added as neighbors of community_name in the dependency graph.

222-> policy-statement/term/community is a leafref of community/community-name. So community-name is added as neighbor of policy-statement/term/community.

224-> 'community' is found under 'term' list. There is one more path (policy-statement/term/ term-name) found in the mapping, which has the prefix 'policy-statement/term'.

226-> 'term-name' is found under the list 'policy-statement'. There is a path in the mapping with the prefix 'policy-statement, which is 'policy-statement/policy-name'.

228 -> Again vrf-import and vrf-export are leafrefs of policy_name.

230-> vrf-import is found under the list 'routing-instances/instance'. There is a path ('routing-instance/instance_name') in the mapping, which starts with 'routing-instances/instance'. So vrf-import is added as a neighbor to instance_name.

*FIG. 7*

```
module: junos
   +--rw filters* [filter-name]
   |  +--rw filter-name          string
   |  +--rw bandwidth-limit?     string
   |  +--rw burst-size-limit     string
   +--rw protocols
   |  +--rw l2circuit!
   |     +--rw interface!
   |        +--rw interface-name          interface-name
   |        +--rw virtual-circuit-id?     uint32
   |        +--rw mtu?                    uint32
   +--rw interfaces
   |  +--rw interface* [interface_name]
   |     +--rw interface_name     string
   |     +--rw speed?             enumeration
   |     +--rw family-input
   |        +--rw name?   -> /filters/filter-name
   |
   |  ...
   |
   |
   |
```

FIG. 12

```
                              300
module: service
   +--rw type-id            type-id
   +--rw connectivity-settings         302
   |  +--rw interfaces
   |  |  +--rw interface
   |  |     +--rw speed?          enumeration
   |  |     +--rw family-input
   |  |        +--rw filters
   |  |           +--rw burst-size-limit    string
   |  |           +--rw bandwidth-limit?    string
   |  +--rw protocols
   |     +--rw l2circuit!
   |        +--rw interface!
   |           +--rw virtual-circuit-id?   uint32
   |           +--rw mtu?                  uint32
   +--rw endpoints ------------ 304
      +--rw protocols
      |  +--rw l2circuit!
      |     +--rw interface!
      |        +--rw interface-name    interface-name
      +--rw interfaces
         +--rw interface
            +--rw interface_name?   string
```

*FIG. 15* set interfaces ge-0/0/5 *speed 1522*
set interfaces ge-0/0/5 *family-input filters bandwidth-limit 80000000*
set interfaces ge-0/0/5 *family-input filters burst-size-limit 15220*
set protocols l2circuit interface ge-0/0/5 *virtual-circuit-id 66915*
set protocols l2circuit interface ge-0/0/5 *mtu 1522*

310

*FIG. 17A* set interfaces ge-0/0/4 *speed 1522*
set interfaces ge-0/0/4 *family-input filters bandwidth-limit 80000000*
set interfaces ge-0/0/4 *family-input filters burst-size-limit 15220*
set protocols l2circuit interface ge-0/0/4 *virtual-circuit-id 66915*
set protocols l2circuit interface ge-0/0/4 *mtu 1522*

INTELLIGENT DEVICE ROLE DISCOVERY

This application is a divisional of U.S. application Ser. No. 15/475,942 filed Mar. 31, 2017, the entire content of which is hereby incorporated by reference.

TECHNICAL FIELD

This disclosure relates to computer networks and, more particularly, to techniques for configuring and managing network devices.

BACKGROUND

A computer network is a collection of interconnected computing devices that can exchange data and share resources. In a packet-based network, such as an Ethernet network, the computing devices communicate data by dividing the data into small blocks called packets, which are individually routed across the network from a source device to a destination device. A variety of intermediate devices operate to route the packets between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, various clients, such as human users, automated scripts or network management systems, can perform configuration tasks as well as collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may receive information either by polling the managed device or by receiving asynchronous events from the devices. In this way, the management interfaces of the managed device may be used to access current operating parameters, system logs, information related to network connectivity, network activity or other status information for the devices, allowing clients to view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Modern network management systems allow the users to create custom service models in real-time or near real-time (or, in other words, "on the fly"). However, these systems do not consider the existing configurations of the network devices.

SUMMARY

In general, a network management system is described that discovers existing service instances running in a network based on device-level configuration. As described, in various examples the network management system discovers existing services implemented by the network by requesting configuration information from network devices implemented by the network, constructing from the configuration information partial service instances representing the services executing on each network device, merging the partial service instances determined to be associated with the same service instance, and promoting the merged partial service instances as a service instance associated with the network devices.

The network management system may automatically validate new or changed network service configurations against the existing network service configurations, regardless of whether the existing network services were configured using the network management system or using other mechanisms. In some examples, the network management system may automatically discover hidden network models (e.g., network models configured using a mechanism other than the network management system) and validate any new or changed configurations against the visible network models (e.g., network models configured using the network management system). In instances where the new or changed configuration may be inconsistent with the existing network models, the network management system may suggest corrective actions required to ensure the new or changed configuration is consistent. Further, because the network management system is configured to discover the hidden network models, the network management system may automatically populate various configuration attributes required to enable the desired configuration changes across the various devices managed by the network management system. In this way, techniques of this disclosure may simplify management of networks while reducing the likelihood of misconfiguration as compared to typical network management techniques.

In one example approach, a method of modeling services in a network includes identifying externally mapped attributes in a vendor neutral yang model of a network service; assigning an attribute type to one or more of the externally mapped attributes, wherein assigning includes determining, by a learning system, the attribute type of one or more of the externally mapped attributes based on an analysis of attribute types assigned to the externally mapped attributes of other network services; constructing a separate dependency graph for each of the externally mapped attributes; and building a separate hidden service model for each of the externally mapped attributes, wherein the externally mapped attribute for each hidden service model is a merge attribute for that hidden service model.

In another example approach, a network management system includes a network interface; a user interface; memory; and one or more processors connected to the memory, wherein the memory includes instructions that, when executed by the one or more processors, cause the processors to train a learning module to identify attribute types, identify externally mapped attributes in a vendor neutral yang model, assign an attribute type to each of the externally mapped attributes, wherein the attribute type is assigned by the learning module, construct a separate dependency graph for each of the externally mapped attributes; and build a separate hidden service model for each of the externally mapped attributes, wherein the externally mapped attribute for each hidden service model is a merge attribute for that hidden service model.

In yet another example approach, a computer-readable storage medium stores instructions that, when executed, cause one or more processors to train a learning module to identify attribute types; identify externally mapped attributes in a vendor neutral yang model; assign an attribute type to each of the externally mapped attributes, wherein the attribute type is assigned by the learning module; construct a separate dependency graph for each of the externally mapped attributes; and build a separate hidden service model for each of the externally mapped attributes, wherein the externally mapped attribute for each hidden service model is a merge attribute for that hidden service model.

In yet another example approach, a method of recognizing device roles of a network device includes configuring a learning module to include a learning model, the learning model trained to associate configuration segments for each of a plurality of network devices with device roles performed by the network devices; discovering a network service on a network; receiving configuration information from the discovered network service; splitting the configuration information received from the discovered network service into configuration segments based on a vendor neutral yang model associated with the discovered network service; and determining if the discovered network service performs one or more of the device roles performed by the network devices used to train the learning model, wherein determining includes applying the learning model to the configuration segments of the discovered network service.

In yet another example approach, a network management system includes a network interface, memory, and one or more processors connected to the memory, wherein the memory includes instructions that, when executed by the one or more processors, cause the network management system to configure a learning module to include a learning model, the learning model trained to associate configuration segments for each of a plurality of network devices with device roles performed by the network devices; discover a network service on a network; receive configuration information from the discovered network service via the network interface; split the configuration information read from the discovered network service into configuration segments based on a vendor neutral yang model associated with the discovered network service; and determine if the discovered network service performs one or more of the device roles performed by the network devices used to train the learning model, wherein determining includes applying the learning model to the configuration segments of the discovered network service.

In yet another example approach, a method of recognizing interface types in a network device includes configuring a learning module to include a learning model, the learning model trained to associate configuration segments for each of a plurality of network devices with interface types provided by the network devices; discovering a network service on a network; receive configuration information from the discovered network service; splitting the configuration information received from the discovered network service into configuration segments based on a vendor neutral yang model associated with the discovered network service; and determining the interface types associated with the discovered network service, wherein determining includes applying the learning model to the configuration segments of the discovered network service.

The details of one or more examples are set forth in the accompanying drawings and the description below. Other features, objects, and advantages will be apparent from the description and drawings, and from the claims.

BRIEF DESCRIPTION OF DRAWINGS

FIG. 7 is a conceptual diagram illustrating one technique for constructing a dependency graph for a service, in accordance with one or more aspects of the disclosure.

FIG. 12 illustrates a vendor neutral configuration model.

FIG. 15 illustrates grouping of a device configuration at the service level and at the endpoint level, in accordance with techniques of this disclosure.

FIGS. 17A and 17B illustrate configuration information for two endpoint devices.

DETAILED DESCRIPTION

Figure 1:
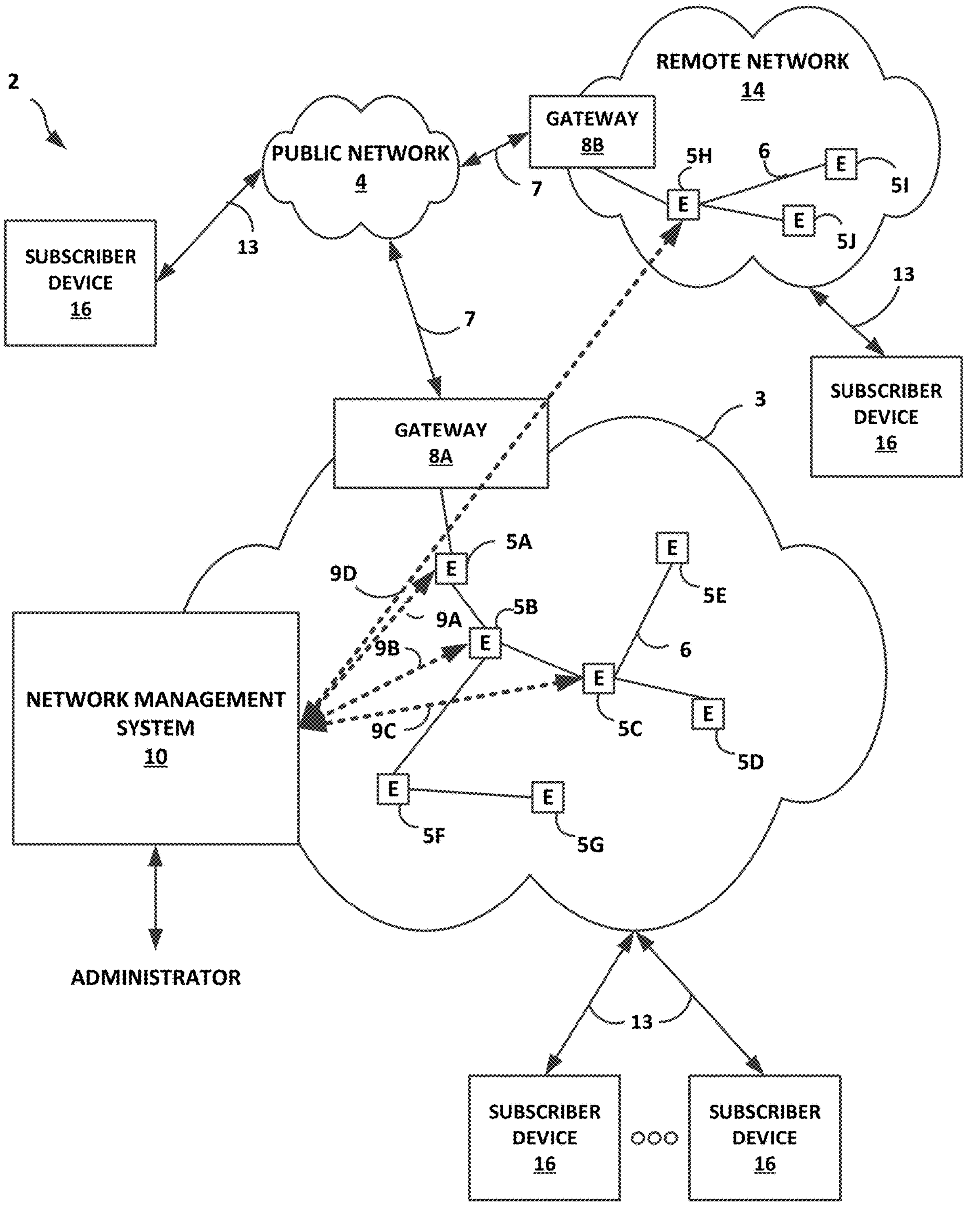
FIG. 1 is a block diagram illustrating an example network management system that manages network resources of an enterprise network, in accordance with one or more aspects of the disclosure.

The attached drawings illustrate examples. Elements indicated by reference numbers in the attached drawings correspond to elements indicated by like reference numbers in the following description. In the attached drawings, ellipses indicate the presence of one or more elements like those separated by the ellipses. Alphabetical suffixes on reference numbers for similar elements are not intended to indicate the presence of particular numbers of the elements. In this disclosure, elements having names that start with ordinal words (e.g., "first," "second," "third," and so on) do not necessarily imply that the elements have a particular order. Rather, such ordinal words are used to refer to different elements of a same or similar type.

As noted above, network administrators use a network management system (NMS) to discover, monitor and configure devices present on the network. In addition, some network administrators use network management systems to define custom services on the fly. The network management system can then create instances of these custom services and manage the complete life cycle of each service defined in the NMS.

Currently, most network management systems do not consider the existing configurations in the network devices. This is a problem. A network management system should not delete "unmanaged active configuration". To address this issue, in one example approach, a network management system per the present disclosure discovers existing configurations in devices when the NMS is installed.

At times, network administrators may use CLI scripts (e.g., SLAX scripts) to push configurations out-of-band to network devices. Such an approach increases the difficulty of service discovery. Therefore, in some example approaches, a network management system includes techniques that aim to replace CLI scripts with tools that automate the configuration of devices making the job easier for users. Such a network management system may, in some example approaches, receive and document out-of-band configurations, validate such configurations and come up with fixes for erroneous configurations, if needed. In one such approach, when a new service definition is created by the user, the network management system makes sure that the service is properly modeled and mapped to a low-level configuration.

Service abstraction is an approach that helps network administrators in several ways. One of them is in capturing validations in the context of a connectivity service. Services have two types of attributes: service level attributes, whose values are same across all the endpoints; and endpoint level attributes, which are specific to each endpoint.

In the case of a point-to-point (P2P) service, for example, the service requires that the same virtual circuit ID be configured on both endpoints. This validation is captured only in the service model and not in the device yang. The NMS restricts the user from configuring a wrong virtual circuit ID, because the user configures the virtual circuit ID at the service level directly. This is because service level attributes are common for all the endpoints.

The same rule applies to the maximum transmission unit (MTU) of the endpoints in a P2P service. When a user configures a different MTU in a device out-of-band, the system identifies this error during service discovery and prompts the user to change the MTU in one of the endpoints. This is possible because the MTU is modeled as a service level attribute and all such errors can be captured if the entire device configuration is captured as multiple network models.

FIG. 1 is a block diagram illustrating an example network management system that manages network resources of an enterprise network, in accordance with one or more aspects of the disclosure. In the example of FIG. 1, a network management system 10 discovers existing service instances running in a network 2. As described below, in various examples the network management system discovers existing configuration services running in the network by requesting configuration information from network devices running in the network, constructing partial service instances representing the services, merging the partial service instances and promoting the merged partial service instances as a service.

In the example of FIG. 1, network management system 10 manages services provided by network elements 5A-5J (collectively, "network elements 5") and gateways 8A and 8B (collectively "gateways 8") of network 2. In some such example approaches, managed network elements 5 and managed gateways 8 of network 2 are network devices interconnected via communication links 6 to form a communication topology to exchange resources and information. Network elements 5 may include, for example, routers, switches, other gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, network 2 may transmit data via any other discrete data unit defined by any other protocol, such as a cell defined by the Asynchronous Transfer Mode (ATM) protocol, or a datagram defined by the User Datagram Protocol (UDP). Communication links 6 interconnecting network elements 5 and gateways 8 may be physical links (e.g., optical, copper, and the like) or wireless links. Network 2 may be an enterprise network, a service provider network or any other network in which managed network devices provide network services to packet flows.

In some example approaches, two or more network elements 5 (e.g., routers, switches, firewalls or gateways) may be configured in a distributed system of devices (nodes) that together act as a single network service device. Because distributed routing systems comprise multiple devices, distributed routing systems may be able to route larger volumes of network traffic than individual routing devices and may be able to provide more network services than individual routing devices. Similarly, distributed firewall systems may be able to process larger volumes of network traffic than individual firewall systems and may be able to provide more granular services than individual firewall devices.

As shown in FIG. 1, in one example approach, network 2 includes a workgroup network 3 connected through a public network 4 (e.g., the Internet) to a remote network 14. In one example approach, workgroup network 3 is connected to public network 4 via a communication link 7 connected to gateway 8A and is connected through public network 4 to a remote network 14 via a second communications link 7 from public network 4 to gateway 8B of remote network 14. Subscriber devices 16 may be connected to workgroup network 3 through a communication link 13 to a gateway 8, and to public network 4 or remote network 14 via similar communication links 13. Public network 4 and remote network 14 may provide access to web servers, application servers, public databases, media servers, end-user devices, and other types of network resource devices and content.

Network devices in public network 4 may present security threats to network 2. For example, devices in public network 4 may attempt to deliver worms, trojans, and/or viruses to one or more of network elements 5. As another example, a hacker using a device in public network 4 may attempt to infiltrate elements of network 2 to snoop, corrupt, destroy, or steal information stored by one or more of the network elements 5.

In the example shown in FIG. 1, network management system 10 is communicatively coupled to network elements 5 for configuring and managing the network elements, including controlling operations of the network elements and the services provided by the network elements. In some example approaches, network management system 10 communicates with a management interface (e.g., CLI interface) of each network element 5 via communication links 6. In some such example approaches, network management system 10 uses a network management protocol designed for management of configuration data within managed network elements 5, such as the CLI protocol, the SNMP protocol or the Network Configuration Protocol (NETCONF) protocol or a derivative thereof, such as the Juniper Device Management Interface, to configure and manage the network elements. In some example approaches, network management system 10 is coupled directly to the various elements 5. In some example approaches, network management system 10 is coupled indirectly to various elements 5 and directly to others.

Workgroup network 3, public network 4 and remote network 14 may provide services to subscribers via subscriber devices 16. In one example approach, a network service provider who administers at least parts of network 2 may offer services to subscribers associated with devices with access to network 2. Services offered may include, for example, traditional Internet access, Voice-over-Internet Protocol (VoIP), video and multimedia services, security services, and linking customer sites through network 2 using one of a point-to-point Ethernet service, multipoint-to-multipoint Ethernet service, point-to-multipoint Ethernet service, full-mesh L3VPN, and hub-and-spoke L3VPN, for instance. Network 2 may support multiple types of access network infrastructures that connect to enterprise network access gateways to provide access to the offered services.

In general, any one or more of subscriber devices 16 may request authorization and data services by sending a session request to a gateway 8. In turn, the gateway 8 typically accesses an Authentication, Authorization and Accounting (AAA) server (not shown) to authenticate the subscriber device requesting network access. Once authenticated, any of subscriber devices 16 may send subscriber data traffic toward network 2 to access and receive services provided by workgroup network 3, by public network 4 or by remote network 14, and such packets may traverse network 2 as part of at least one packet flow. The term "packet flow," "traffic flow," or simply "flow" refers to a set of packets originating from a particular source device and sent to a particular destination device. A single flow of packets, in either the upstream (sourced by one of subscriber devices 16) or downstream (destined for one of subscriber devices 16) direction, may in some example approaches be identified by the 5-tuple: <source network address, destination network address, source port, destination port, protocol>, for example. This 5-tuple generally identifies a packet flow to which a received packet corresponds. An n-tuple refers to any n items drawn from the 5-tuple. For example, a 2-tuple for a packet may refer to the combination of <source network address, destination network address> or <source network address, source port> for the packet. Moreover, a subscriber device 16 may originate multiple packet flows upon authenticating to enterpriser network 2 and establishing a communication session for receiving data services.

Similarly, any one or more of subscriber devices 16 connected to public network 4 or to remote network 14 may request authorization and data services by sending a session request to a gateway 8 of network 2. Once authenticated, any of subscriber devices 16 may send subscriber data traffic toward network 2 to access and receive services provided by network 2 or by public network 4, and such packets may traverse network 2 as part of at least one packet flow.

In one example approach, upon detecting a new traffic flow, a gateway 8 may authenticate new subscribers to the AAA server, e.g., by way of the RADIUS or Diameter protocols, and, at that time, may receive a service request or other information that defines the services to be applied to the subscriber or that maps the various traffic expected for the subscriber to one or more service flows. Upon detecting a new flow, a gateway 8 may select a service chain for the flow based on the service profile and traffic type. For example, a gateway 8 may select a service chain for the packet based on the service profile received for the subscriber and/or based on the type of traffic, e.g., HTTP traffic or VoIP traffic.

As noted above, the various networks of network 2, i.e., workgroup network 3 and remote network 14 include network resources (network elements 5 and gateways 8) configurable by network management system 10 as part of provisioning services for use by customers/subscribers of the network 2. Any of the network resources may represent a device to be configured (DTC), such as a router, switch, optical device, Converged Cable Access Platform (CCAP) element, microwave element, passive optical network element, a service node, a virtual machine executing a service, a virtual router for a BGP IP VPN, and other network elements. In some examples, any of network elements 5 and gateways 8 may alternatively or additionally represent one or more hardware or software components of a given DTC, such as a hardware or software interface, a service line card, a forwarding line card, a network link, a label-switched path (LSP), a routing instance (e.g., a virtual routing and forwarding instance (VRF)), etc. In other words, a DTC may include multiple network elements 5 or multiple gateways 8, or combinations thereof, so long as each of the network resources are capable of being separately and synchronously configured without loss of integrity to the operation of any of the network resources.

Once network elements 5A-5J and gateways 8A and 8B are deployed and activated, an administrator may use network management system 10 to manage the network devices using a device management protocol. One example device protocol is the Simple Network Management Protocol (SNMP) that allows network management system 10 to traverse and modify management information bases (MIBs) that store configuration data within each of managed network elements 5. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the description of which is incorporated herein by reference.

In common practice, network management system 10 and the network elements 5 and gateways 8 managed by network management system 10 are centrally maintained by an IT group of the enterprise and are collectively referred to as an element management system (EMS) or a network management system (NMS). In either case, a user/administrator interacts with network management system 10 to remotely monitor and configure network elements 5. For example, the administrator may receive alerts from network management system 10 regarding any of network elements 5 or gateways 8, view configuration data of network elements 5 and gateways 8, modify the configurations data of network elements 5 and gateways 8, add new network devices to network 2, remove existing network devices from network 2, or otherwise manipulate the network 2 and network devices therein. Although described with respect to an enterprise network, the techniques of this invention are applicable to other network types, public and private, including LANs, VLANs, VPNs, and the like.

Responsive to configuration input from the user, network management system 10 communicates with managed devices 5 to provision network services provided by the managed devices. In some approaches, network management system 10 may use a network management protocol designed for management of configuration data within managed network elements 5, such as the CLI protocol, the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in R. Enns et al., RFC 4741: "NETCONF Configuration Protocol," Network Working Group, the Internet Engineering Task Force draft, December 2006, available at http://tools.ietf.org/html/rfc4741, the description of which is incorporated herein by reference. In some approaches, network management system 10 may establish NETCONF sessions with one or more of network elements 5. In the example of FIG. 1, for example, network management system 10 participates in NETCONF sessions 9A-9D with network elements 5A-5C and 5H, respectively.

Not all services are, however, configured at the service level. For instance, a service may be configured only at the device level, or may have been configured directly by a user or via automated scripts. It would be advantageous to be able to extend validations provided by "service abstraction" to the other device configurations by generating hidden service models. That is, it would be advantageous to extend validations found in the services to all configurations in the devices. In one example approach, network management system 10 exploits, therefore, the additional validations provided by service abstraction to reduce errors in existing service devices, even those that are not configured based on a defined service model, by automatically creating hidden service models.

In one example approach, NMS 10 validates the current configuration and provides possible corrective actions when a configuration change happens or on receiving a network event. While providing corrective steps, NMS 10 populates most of the configuration attributes. In one example approach, NMS 10 does not delete unmanaged configurations when deploying a configuration from the NMS.

In one example approach, the network management system uses machine learning 1) to help in constructing hidden network models; 2) to discover device roles in the network; 3) to discover port roles; and 4) to configure attributes with learned defaults during configuration automation.

Figure 2:
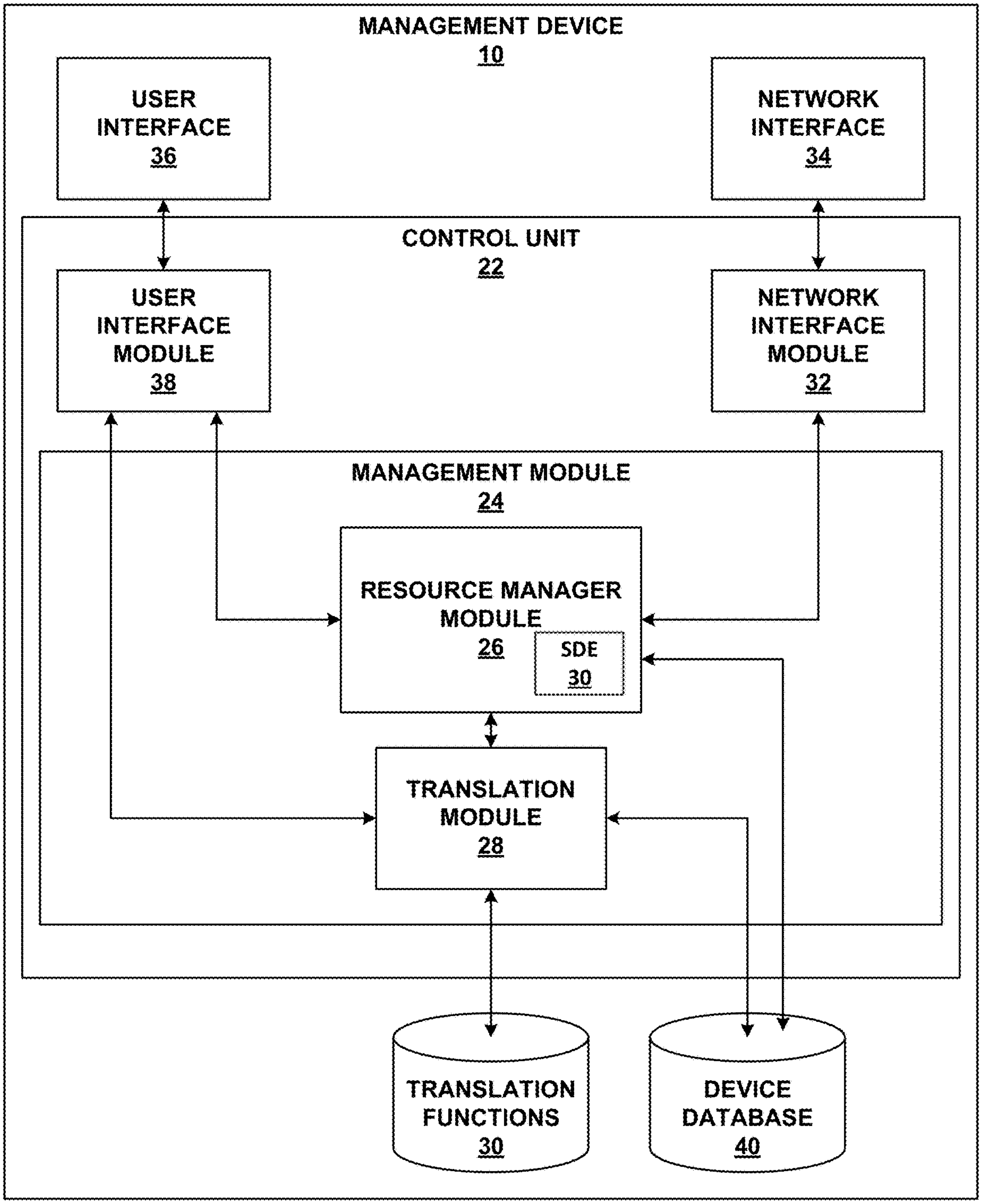
FIG. 2 is a block diagram illustrating an example set of components for network management system 10 of FIG. 1.

FIG. 2 is a block diagram illustrating an example set of components for network management system 10 of FIG. 1. In this example, network management system 10 includes control unit 22, network interface 34, and user interface 36. Network interface 34 represents an example interface that can communicatively couple network management system 10 to an external device, e.g., one of elements 5 or gateways 8 of FIG. 1. Network interface 34 may represent a wireless and/or wired interface, e.g., an Ethernet interface or a wireless radio configured to communicate via a wireless standard, such as one or more of the IEEE 802.11 wireless networking protocols (such as 802.11 a/b/g/n or other such wireless protocols). Network management system 10 may include multiple network interfaces in various examples, although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrator (FIG. 1) interacts with network management system 10, e.g., to provide input and receive output. For example, user interface 36 may represent one or more of a monitor, keyboard, mouse, touchscreen, touchpad, trackpad, speakers, camera, microphone, or the like. Furthermore, although in this example network management system 10 includes a user interface, administrator 12 need not directly interact with network management system 10, but instead may access network management system 10 remotely, e.g., via network interface 34.

In this example, control unit 22 includes user interface module 38, network interface module 32, and management module 24. Control unit 22 executes user interface module 38 to receive input from and/or provide output to user interface 36. Control unit 22 also executes network interface module 32 to send and receive data (e.g., packets) via network interface 34. User interface module 38, network interface module 32, and management module 24 may again be implemented as respective hardware units, or in software or firmware, or a combination thereof.

In one example approach, control unit 22 executes management module 24 to manage various network devices, e.g., network elements 5 of FIG. 1. Management includes, for example, configuring the network devices (e.g., network elements 5 or gateways 8) per instructions received from a user (e.g., administrator of FIG. 1) and providing the user with the ability to submit instructions to configure the network devices. In one such example, management module 24 further includes resource manager engine 26 and translation module 28.

In some example approaches and as shown in FIG. 2, resource manager engine 26 includes a service discovery engine (SDE) 50. SDE 50 receives device configuration information read by NMS 10 from network devices and determines, from the device configuration information, service configuration information associated with existing services in network 2. In some such approaches, SDE 50 uses the service-level model, the mapper/template, the device's YANG model and the device configuration imported from each device to determine the service-level configuration or configurations that would have resulted in the imported device configuration. A service discovery engine is described in U.S. patent application Ser. No. 15/195,960, filed Jun. 28, 2016, the description of which is incorporated herein by reference.

Management module 24 is configured to receive high-level configuration instructions for a set of managed network devices from a user, such as administrator 12. Over time, the user may update the configuration instructions, e.g., to add new services, remove existing services, or modify existing services performed by the managed devices. The high-level instructions may be structured per, e.g., YANG. In some examples, management module 24 also provides the user with the ability to submit translation functions that translation module 28 executes to transform high-level configuration instructions to device-specific, low-level configuration instructions, as discussed below.

Network management system 10 also includes device database 40. Device database 40 generally includes information describing managed network devices, e.g., elements 5. For example, device database 40 may include information indicating device identifiers (such as MAC and/or IP addresses), device type, device vendor, devices species (e.g., router, switch, bridge, hub, etc.), or the like. Device database 40 also stores current configuration information (e.g., high-level configuration information, or in some cases, both high-level configuration and low-level configuration information) for the managed devices (e.g., elements 5).

In accordance with the techniques of this disclosure, network management system 10 includes a memory storing a variety of different translation functions 30. In particular, translation functions 30 represent different translation functions for different types of managed network devices. For example, translation functions 30 may include one translation function for each vendor of each device that performs a particular function. As one example, translation functions 30 may include translation functions for each of routers, switches, bridges, and hubs from each vendor that provides such devices. Thus, if there were three vendors for each of these devices, there would be a total of twelve translation functions (three venders multiplied by four devices, router, switch, bridge, and hub).

In this manner, the user may submit high-level configuration instructions to network management system 10 via, e.g., user interface 36. Control unit 22 receives the instructions via user interface module 38, which passes the instructions to resource manager engine 26 of management module 24. Resource manager engine 26 submits the high-level configuration instructions to translation module 28, to be translated into low-level, device-specific configuration instructions. Translation module 28 determines which devices are managed, as well as vendors for the devices, using device database 40. Translation module 28 determines which of translation functions 30 to execute on the high-level configuration instructions based on the information of device database 40, e.g., which of the devices are to receive the low-level configuration instructions and vendors of the devices that are to receive the low-level configuration instructions. Translation module 28 then executes each of the determined translation functions of translation functions 30, providing the high-level configuration instructions to the translation functions as input and receiving separate sets of low-level configuration instructions (i.e., distinct sets for different vendors of the managed network devices to be configured). In one example approach, this is a two-step process. First, translation module 28 translates the high-level configuration instructions to vendor-neutral configuration instructions. Translation module 28 then translates the vendor-neutral configuration instructions to low-level configuration instructions.

In one example approach, resource manager engine 26 may first determine an existing set of high-level configuration information for the devices for which configuration is to be updated, e.g., by retrieving the existing set of high-level configuration information from device database 40. Resource manager engine 26 may then compare the existing set of high-level configuration information to the newly received set of high-level configuration information, and determine differences between the existing and newly received sets of high-level configuration information. Resource manager engine 26 may then pass these differences to translation module 28, for translation first into vendor-neutral configuration instructions and then from the vendor-neutral configuration instructions into respective sets of low-level configuration information. Resource manager engine 26 may also update the existing high-level configuration information recorded in device database 40 based on the newly received set of high-level configuration information. A YANG-based delta configuration generation service engine is described in U.S. patent application Ser. No. 15/198,657, filed Jun. 30, 2016, the description of which is incorporated herein by reference.

A problem arises when an NMS 10 is connected to a network with existing services. When first connected to an existing network, network management system 10 typically has no state regarding any of the service instances already running in the existing network. Existing service instances may number into the tens of thousands. Unaware of the existing service instances, current NMS's, when establishing new network services in a system having existing network services, may set up configurations that conflict with existing service instances. For instance, when an existing P2P service created through a command line interface (CLI) is using a particular UNI interface, that same UNI resource should not be allocated to a P2P service instance created by the network management system.

Furthermore, service configuration can span across multiple devices, creating multiple challenges in reconstructing a service configuration from two or more device configurations. First, as each device may support two or more services, the NMS must split each of the multiple service-related configurations in a single device into the device configurations associated with each service. Second, the NMS must merge aspects of each service configuration determined from the device configuration of each of multiple devices to create a complete service instance.

Techniques are described in U.S. patent application Ser. No. 15/195,960 for a system and method for mapping device-level configuration information into service-level configuration information, the description of which is incorporated herein by reference. A network management system 10 capable of supporting not only high-level model to low-level model mapping, but also low-level model to high-level model mapping, with the mapping from low-level model to high-level model dependent on each device's device-level model, provides an advantage in network management, especially in networks which encounter network devices configured for existing services.

In one example approach, a network management system 10 fetches, from a first network device, configuration data associated with a service executing on the first network device. The NMS constructs, based on the configuration data, a first partial service instance associated with the service executing on the first network device. The NMS merges the first partial service instance with a partial service instance associated with the service executing on a different network device and promotes the merged partial service instance as a service instance. In one such example approach, when the NMS promotes the merged partial service instance as a service instance, the NMS stores the service instance as a service object in a service database. The service object includes service-level configuration information associated with the service instance.

In one example approach, in a service-designer workflow, a service-level model defines a service and a mapper/template relates the service-level model to a device-level model associated with a device (per the device's YANG model). In one example approach, NMS 10 uses the service-level model, the mapper/template, the device's data model (e.g., YANG model) and the device configuration imported from each device to determine the service-level configuration or configurations that would have resulted in the imported device configuration. In one example approach, the NMS includes two mapping functions (e.g., in Python), one for the forward-mapping from service configuration to device configuration and another for the reverse-mapping.

In this manner, network management system 10 can discover existing service instances running in a network. As described herein, in various examples the network management system discovers existing services running in the network by requesting configuration information from network devices running in the network, constructing from the configuration information partial service instances representing the services executing on each network device, merging the partial service instances and promoting the merged partial service instances as a service instance associated with the network devices. In one example approach, a service discovery engine 50 connected through a network management system to a network having network devices executes a build phase in which configuration information read from the network devices is used to build configuration objects related to specific service types and converts the configuration objects to partial service instances based on the service types. Two or more partial service instances are merged into a merged partial service instance and the merged partial service instance is promoted as a service instance associated with one or more network devices.

In one example approach, the network management system includes a service model associated with each type of service. When the service model is created, the structure of the service model is read and understood by the NMS in the form of a dependency graph built based on leafrefs and containment hierarchy in the device model, and mappings and merge attributes defined in the service model.

In one example approach, each service model includes a merge strategy. The network management system uses the merge strategy to combine the partial service instances constructed from two or more devices into a service instance. In one such example approach, when a user defines a service, the NMS suggests possible merge strategies to the user.

In one example approach, when network management system 10 discovers a device, network management system 10 splits the configurations in the device into multiple partial service instances by, for example, service type. This is referred to herein as the "build phase." Then, based on the merge strategy, network management system 10 merges the partial service instances found on the devices with partial service instances found on other devices to form a service instance.

In some example approaches, network management system 10 relies on machine learning and the additional validations provided via "service abstraction" to suggest and validate system generated hidden service models during service discovery. The hidden service models, when completed, represent the device configuration of services on a network device. Such models may be used in conjunction with user-defined network service models and can be tested and validated during service discovery using the techniques performed on the user-defined service models. In one such example approach, machine learning is used to perform one or more of: constructing hidden network models, discovering device roles in the network and discovering port roles in the network. In one example approach network management system 10 includes a learning system such as a neural network; system 10 can, therefore, learn from user suggestions and corrections, as described below.

Figure 3:
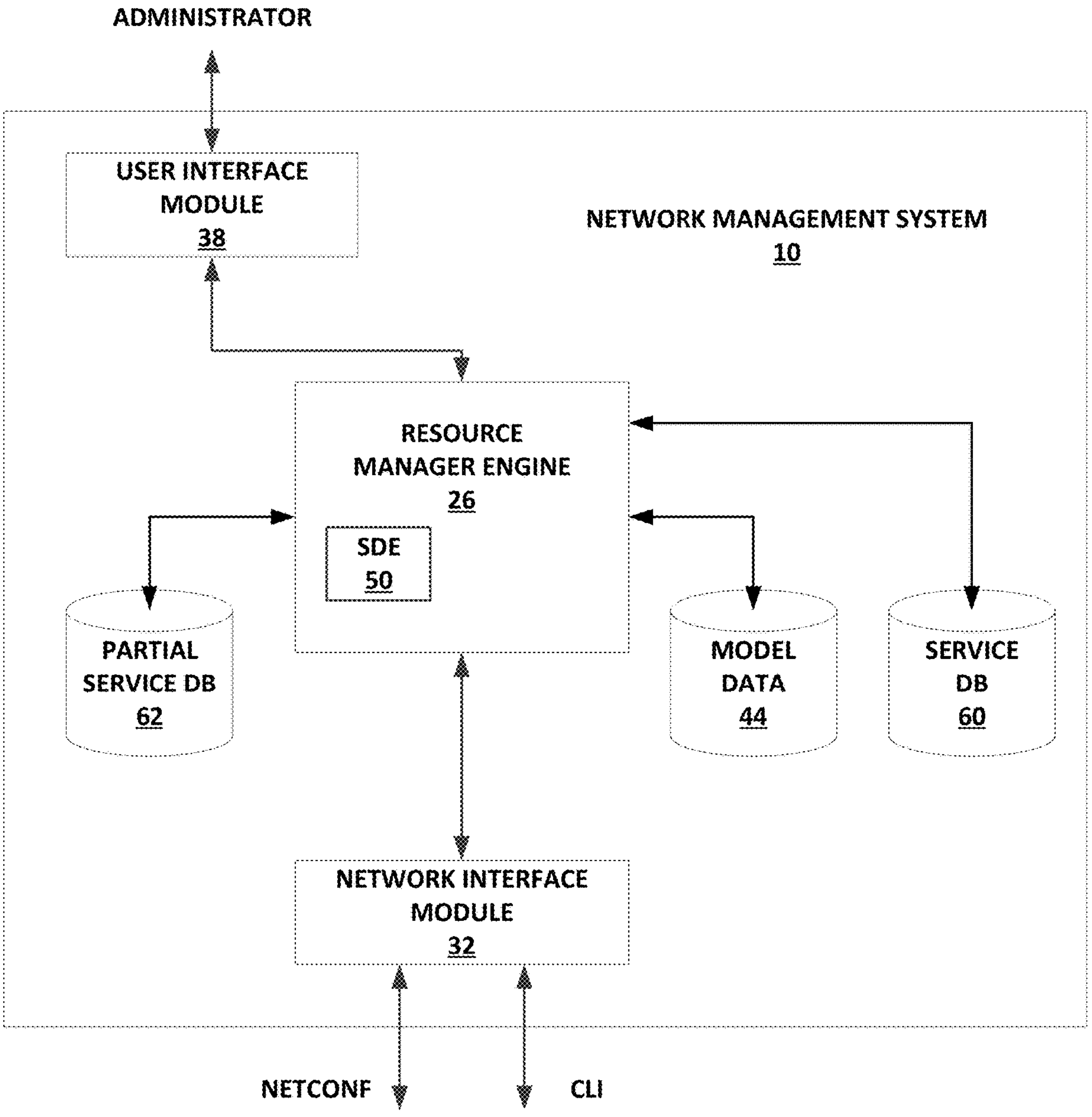
FIG. 3 is a block diagram illustrating an example network management system having a service discovery engine (SDE), in accordance with one or more aspects of the disclosure.

FIG. 3 is a block diagram illustrating an example network management system having a service discovery engine (SDE), in accordance with one or more aspects of the disclosure. In the example of FIG. 3, network management system 10 includes a user interface (UI) module 38 connected to a resource manager engine 26. In one example approach, resource manager engine 26 configures network elements 5 and gateways 8 via network interface module 32 while service discovery engine 50 reads configuration information from network elements 5 and gateways 8 via network interface module 32 or, in some cases, via user interface module 38. In some example approaches, network management system 10 includes model data storage 44, service database 60 and partial service database 62. In some such example approaches, resource manager engine 26 receives information on network elements 5 and gateways 8 from model data storage 44 and configures network elements 5 and gateways 8 based on that information via network interface module 32. In some such example approaches, resource manager engine 26 receives information on services from model data storage 44 and configures services on network 2 based on that information via network interface module 32. In some example approaches, SDE 50 receives, via network interface module 32, device configuration information read from one or more network devices such as network elements 5 and gateways 8. SDE 50 determines the service configuration information corresponding to the received device configuration information as a function of a service model, a device model, the device configuration information and a mapping function that maps the device configuration information to service configuration information corresponding to the provided service. In one example approach, SDE 50 stores partial service instances as they are determined in partial service database 62, and then merges the partial service instances into a service instance before storing the service instance as a service object in service database 60.

In some example approaches, user interface module 38 presents visual interfaces that are responsive to user input received from an administrator via peripheral devices. For example, user interface module 38 may comprise a graphical user interface (GUI) or a command line interface (CLI). For human-cognizable presentation, user interface module 38 may be coupled to a computer monitor, a television, a projector, speakers, or other audio and video output devices (not shown). To receive user input, user interface module 38 may be coupled to a keyboard, a mouse, or other peripherals. In some example approaches, user interface module 38 comprises the user interface for a Juniper Networks NSM. In one example approach, a user interacts with resource manager engine 26 via user interface module 38 to create a service or to modify an existing service.

In one example approach, resource manager engine 26 establishes communication through network interface module 32 with each network element 5 and gateway 8 to be configured and configures the device or devices based on information stored in model data storage 44 for that network resource and, in the case of services, for that service. In one example approach, network interface module 32 includes, e.g., a network interface card having an Ethernet interface. In some such example approaches, network interface module 32 is communicatively coupled to network elements 5 and/or gateways 8 via communication links 6, or via other serial or parallel data communication approaches.

In some example approaches, network management system 10 may use a network management protocol designed for management of configuration data within managed network elements 5, such as the CLI protocol, the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. In some approaches, network management system 10 may establish NETCONF sessions with one or more of network elements 5.

In one example approach, resource manager engine 26 establishes communication through network interface module 32 with each network element 5 and each gateway 8 to be involved in providing a service and configures each device using a network service editor 15 based on information stored in model data storage 44 for the service and for the network elements 5 and gateways 8 used to provide that service. As noted above, network management system 10 may use a network management protocol designed for management of configuration data within managed network elements 5, such as the CLI protocol, the SNMP protocol or the Network Configuration Protocol (NETCONF) protocol or a derivative thereof, such as the Juniper Device Management Interface, to perform the service configuration.

In some example approaches, resource manager engine 26 configures two or more network elements 5 to operate together in a distributed routing system. In some such example approaches, other network elements 5 in network 2 may receive flows of network traffic from the distributed routing system. Such flows of network traffic may include packets, frames, cells, or other communication units. Each flow of network traffic originates at one of the network elements 5 and is destined for a different one of the network elements 5. Upon receiving data in a flow of network traffic, one or more network elements 5 may apply one or more services to the flow of network traffic. For example, upon receiving data in a flow of network traffic, one of the network elements 5 may scan the data for malware, such as computer viruses.

In some example approaches, resource manager engine 26 reads, from devices within network 2, device configuration information corresponding to services that are running on network 2 but that are missing from service database 60. In accordance with the techniques of this disclosure, SDE 50 reverse-maps the device configuration information into service configuration information and, from there, SDE 50 combines the device configuration information into a corresponding service instance saved as a service object to service database 60.

Figure 4:
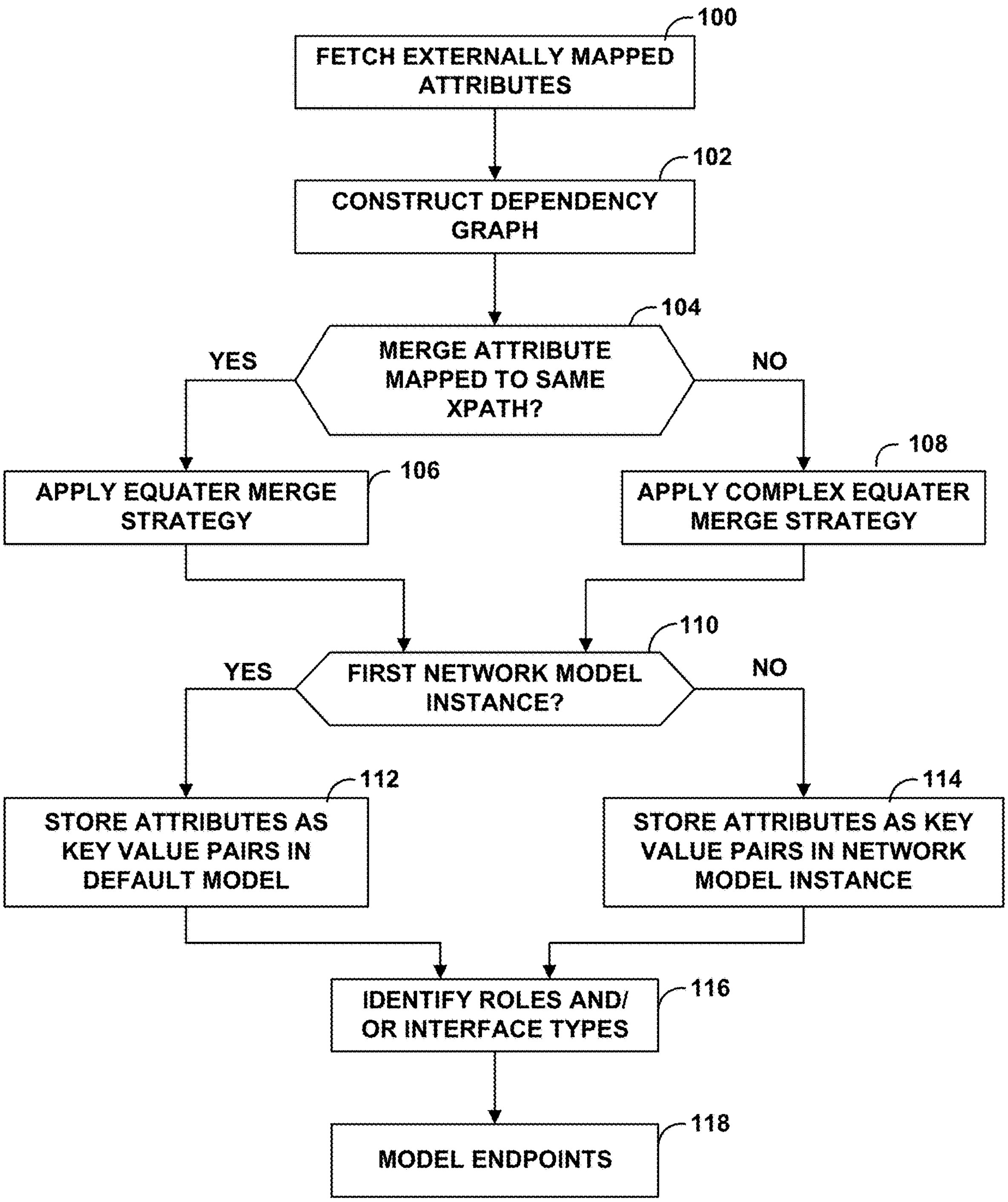
FIG. 4 is a flowchart illustrating an example technique for modeling services in a network, in accordance with aspects of the disclosure.
Figure 5:
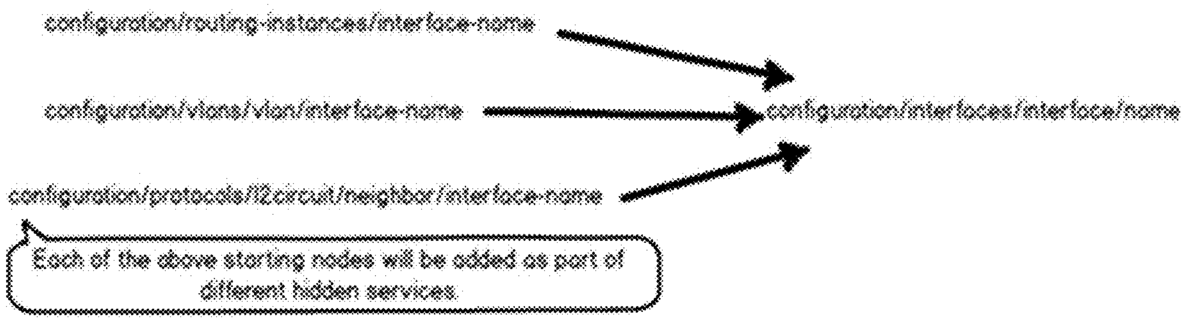
FIG. 5 illustrates a set of starting nodes, in accordance with aspects of the disclosure.
Figure 6:
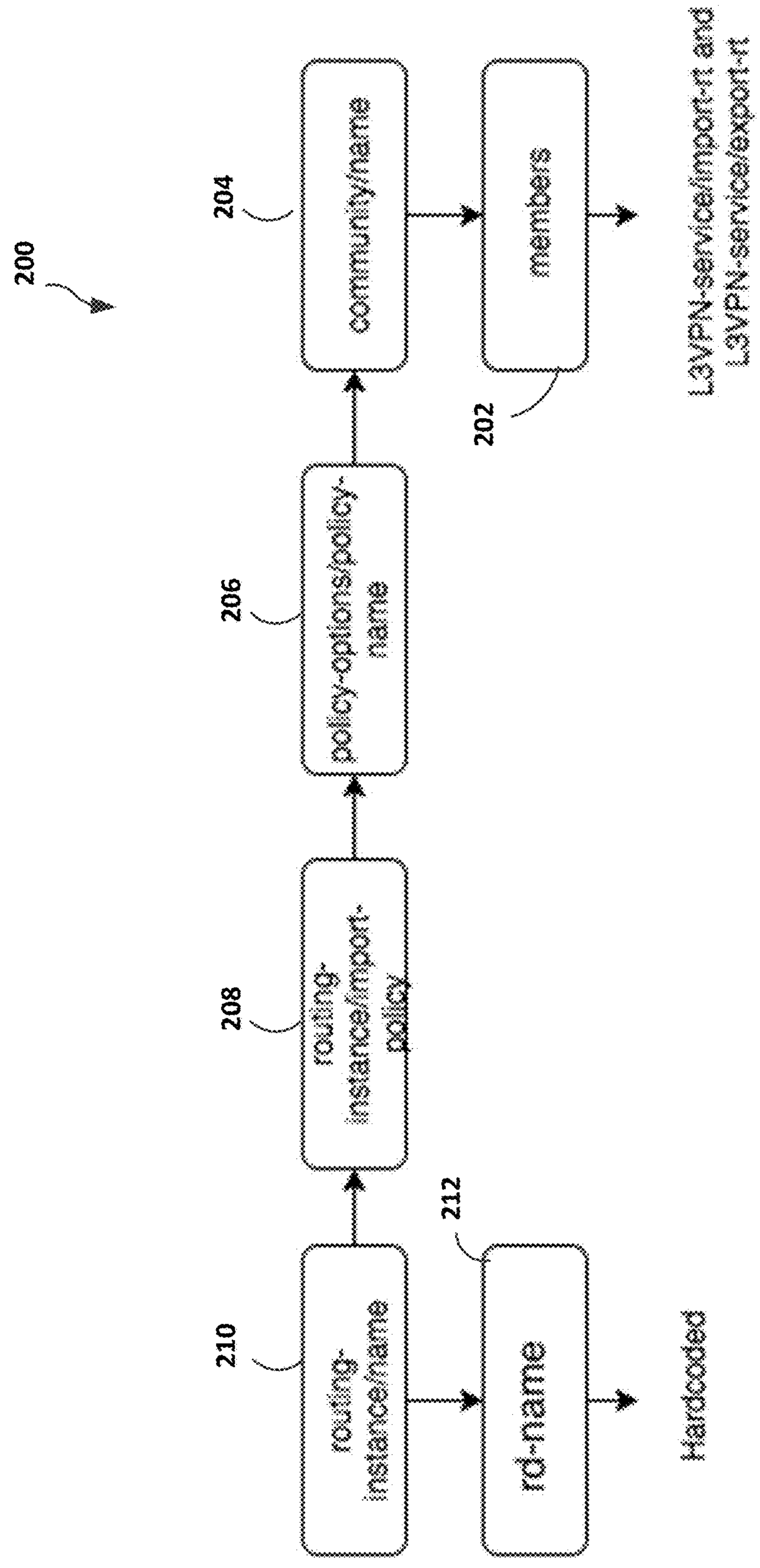
FIG. 6 is a conceptual diagram illustrating an example dependency graph for an L3-VPN service, in accordance with one or more aspects of the disclosure.

FIG. 4 is a flowchart illustrating an example technique for modeling services in a network, in accordance with aspects of the disclosure. FIGS. 5-7 illustrate one example approach for service discovery of an L3-VPN service. As noted above, network configuration services are typically spread across multiple devices. Some of these services are connectivity services such as "L3 VPN", "VPLS", "P2P." Other network configuration services are services such as "dot1q vlan service." The example service discovery approach of FIGS. 5-7 will be used to illustrate the technique of FIG. 4.

In one example approach, when a vendor neutral model is installed, some of its configuration attributes are annotated as externally mapped attributes, using a YANG extension. This is a one-time operation. In one such example approach, there are two types of externally mapped attributes: merge attributes and shared attributes.

In one example approach, system 10 identifies merge attributes in the vendor neutral YANG model. The first step in identifying merge attributes is to identify the referrers for each of the configuration attributes in the vendor neutral model. This is like finding the leafrefs of the current leaf. The only difference here is that there is no leafref construct for external references. System 10, therefore, needs to identify potential matches. This can be based on the leaf type, and other type-related meta data like, for example, range and default. In one example approach, system 10 employs a schema matching approach such as is described in U.S. patent application Ser. No. 15/283,030, filed Sep. 20, 2016, the description of which is incorporated herein by reference.

The second step in identifying merge attributes is to identify the actual leafref instances. This can be done by comparing values across devices. Sometimes, however, the referrer may not share the same leaf type. For example, in the case of interface name, interfaces may be referred to by several other attributes along with the unit. The value may not, therefore, have an exact match. But the referrer value will have something like 'ge-0/0/1.0', where the .0 indicates the unit number. If the second value (unit number in this case) is also an external leafref, then it also is marked as merge attribute. Otherwise, a default will be identified for the second value.

The next step in identifying merge attributes is to isolate the original leaf from the referrers. If only one of the attributes is a list key, then the attribute automatically becomes the leaf and the others become the referrers. If there are more than one list keys, then the one which does not have any other lists in the hierarchy becomes the leaf. If there is a complex external leafref, (like ge-0/0/1.0), then both the values form the list keys in the same hierarchy. In this case, interface is a list with the key interface-name and it contains another list with the name unit and with the key unit-name. Also, the attribute which has a local leafref automatically becomes the source.

The following, therefore, are, in one example approach, the steps for identifying merge attributes:

1) Find each attribute, which is a list key or at least a unique attribute in the list.
2) If the attribute involves simple strings without much pattern validation, then skip current attribute.
3) Do a breadth first search on the schema and pick attributes with the above characteristics.
4) Find an attribute, which has the same attribute definition or a complex leafref yang extension.
5) Group the attributes and mark one of them as leaf.

During service discovery, check if the values are shared among the attributes found in above steps. If the value is same for two different services, then current attribute may be a merge attribute.

Shared attribute identification will be discussed next. Shared attributes are a special kind of merge attributes. Here, the leaves and the external referrers are same. Only the first level lists are considered for shared attributes, along with the top-level containers. Before calculating this, leafrefs are resolved.

In one example approach, once the user reviews and confirms the externally mapped attributes, the identified externally mapped attributes in the vendor neutral model are annotated with a YANG extension. An example YANG extension is:

```
leaf neighbor {
type string;
ca-ext:externalref {
  path "configuration/interfaces/interface/unit/address";
}
}
```

In one example approach, on a fresh setup, where the user has not modeled any service in network 2, all the attributes in the device configurations are modeled as hidden network models. In the example given in FIG. 4, resource manager engine 26 creates hidden network models by identifying externally mapped attributes in the vendor neutral yang model in model data store 44 (100). In one example approach, externally mapped attributes may use the external reference yang extension shown above in the vendor neutral configuration yang.

FIG. 5 illustrates a set of starting nodes, in accordance with aspects of the disclosure. In the example approach shown in FIG. 4, the starting nodes of FIG. 5 are added as part of different hidden services.

Returning to FIG. 4, resource manager engine 26 constructs a dependency graph 200 for each externally mapped attribute (102). FIG. 6 is a conceptual diagram illustrating an example dependency graph for an L3-VPN service, in accordance with one or more aspects of the disclosure. FIG. 7 is a conceptual diagram illustrating one technique for constructing such a dependency graph for a service, in accordance with one or more aspects of the disclosure. As shown in FIGS. 6 and 7, a low-level schema dependency graph 200 may be used in the hidden model build phase to capture the relationship across configuration objects that are related to a service. A dependency graph such as dependency graph 200 captures the relationship across configuration objects related to a service and is specific to the service. In one example approach, a dependency graph specific to each service type is constructed each time a new service type is defined. In some example approaches, as soon as the service definition is uploaded, SDE 50 constructs the dependency graphs for that service from the mapper/translator before storing the dependency graphs as part of the service object in service database 60. In one example approach, each dependency graph consists of a list of column values as nodes.

In one example approach, each vendor neutral model stored in model data storage 44 is annotated with its merge attributes; NMS 10 reads the attributes from the vendor neutral yang model data stored in model data storage 44 (100). Then for each externally mapped attribute, NMS 10 constructs a dependency graph as shown at 102. Any externally mapped attribute used to build the current network model is marked as a merge attribute of the current network model.

A check is made at 104 to determine if the merge attribute is mapped to the same XPATH. If so, an 'equator' merge strategy is used at 106. Otherwise, 'complex-equator' merge strategy is used at 108. The equator and the complex-equator merge strategies are described in U.S. patent application Ser. No. 15/195,960, filed Jun. 28, 2016, the description of which is incorporated herein by reference.

Figure 9:
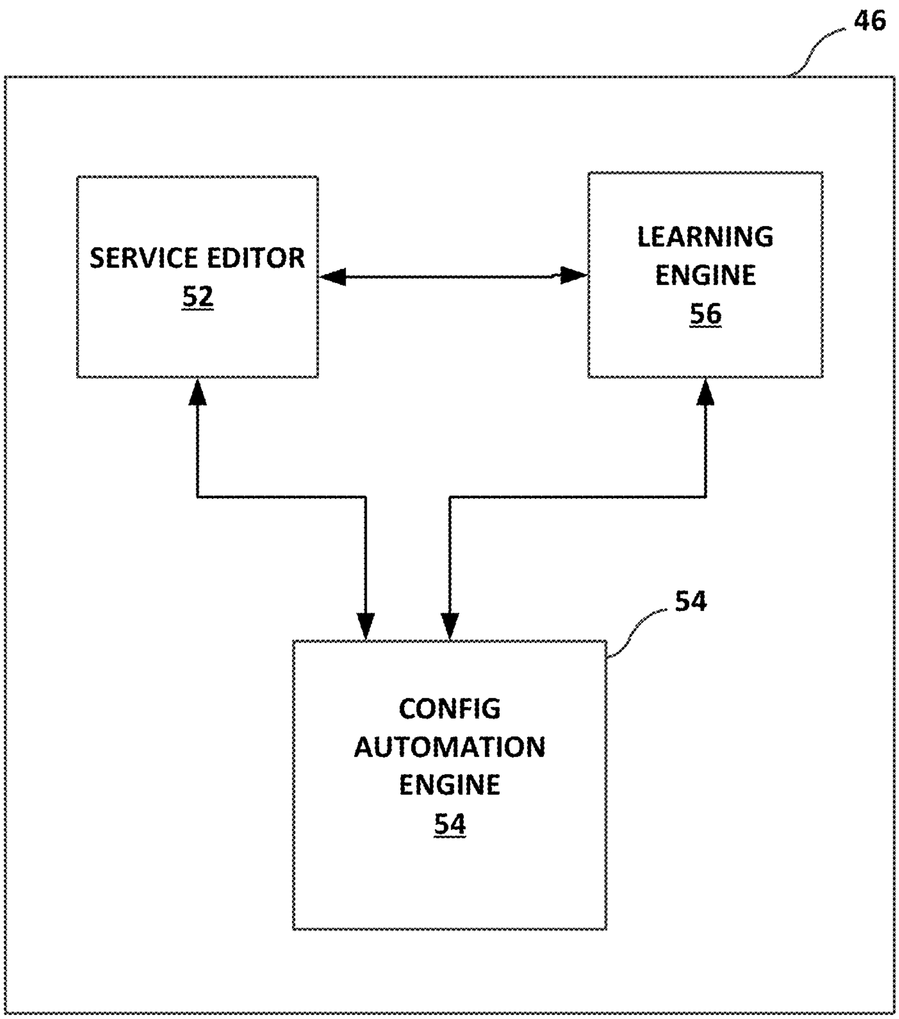
FIG. 9 is a block diagram illustrating an example network service designer, in accordance with one or more aspects of the disclosure.

A check is made at 110 to determine is this is the first network model instance (110). When the first network model instance is discovered at 110, all the attributes are stored as hardcoded mappings or network level or endpoint level attributes, based on the pre-trained data in the underlying service learning engine (112). (A representative learning engine 56 is shown in FIG. 9 below.) For instance, when an attribute value differs between two endpoints, then the attribute may be labeled as an endpoint attribute, after user review, and the learning engine 56 then trained with the information. For subsequent instances, the attributes are stored as key value pairs in each network model instance (114). In one example approach, the attribute parts of the network model instance are stored as key value pairs with a flag mentioning where they belong, whether at the network level, endpoint level or as a hardcoded mapping attribute. Each network model has an auto-generated type and, sometimes, the attributes may belong to a user-created service type.

The approach described in FIG. 4 will, in some example approaches, also be used to identify mappings with hardcoded values, to identify whether an external mapping is captured as part of current network model instance (i.e., the system checks if the neighbor device has the same value captured by current externally mapped attribute), to identify endpoint minimum/maximum limits, etc.

In one example approach, as is shown in FIG. 4, for each device part of a network model instance, network management system 10 also tries to identify the roles performed by each network service (116). The detailed steps to identify device roles are explained below. In one such example approach, system 10 may try to model different types of endpoints as a function of role (118). For example, a three stage CLOS modeled as a service has two types of endpoints. The endpoints can be either leaves or spines. The minimum number of endpoints in each of these types should therefore be 1. This parameter can be learned by reading the device configurations.

In one example approach, also as is shown in FIG. 4, for each device part of a network model instance, network management system 10 also tries to identify the interface types for each network service (116). The detailed steps to identify interface types are explained below.

In one example approach, when the user tries to create a service model using the service designer module, system 10 prompts the user with the hidden network models. A user can choose to use these hidden models as is or he may make some customizations. In one such example approach, system 10 ensures that attributes which are deleted from the hidden model as part of user customizations are not actually deleted. They are just kept hidden. In this way, the hidden model may be shared by a user.

In one example approach, members 202 in the example dependency graph 200 of FIG. 6 are found in a community list and are neighbors of community_name 204. Community_name 204 is a neighbor of policy-options/policy-name 206. Routing-instance/import-policy 208 is a neighbor of routing-instance/import policy 210. Route distinguisher name (rd-name) 212 is also a neighbor of routing-instance/import policy 210.

The externally mapped attributes associated with dependency graph 200 are marked as merge attributes of the network model for that service. In the example shown in FIG. 7, At 220, SDE 50 locates 'members' in a community list. 'Community_name' is also part of the mapping. Members are added as neighbors of community_name in the dependency graph.

At 222, since policy-statement/term/community is a leafref of community/community_name, SDE 50 adds community_name as a neighbor of policy-statement/term/community.

At 224, SDE 50 finds 'community' under 'term' list. There is one more path (policy-statement/term/term-name) found in the mapping, which has the prefix 'policy-statement/term'.

At 226, SDE 50 finds 'term-name' under the list 'policy-statement.' There is a path in the mapping with the prefix 'policy-statement', which is 'policy-statement/policy-name'.

At 228, SDE 50 notes that vrf-import and vrf-export are leafrefs of policy name. VRF-import and VRF-export refer to Virtual Routing and Forwarding instance (VRF) routes imported and exported, respectively, by routers that are members of a L3-VPN.

At 230, SDE 50 finds vrf-import under the list 'routing-instances/instance'. There is a path ('routing-instances/instance/instance_name') in the mapping, which starts with 'routing-instances/instance'. So vrf-import is added as a neighbor to instance_name.

Figure 8:
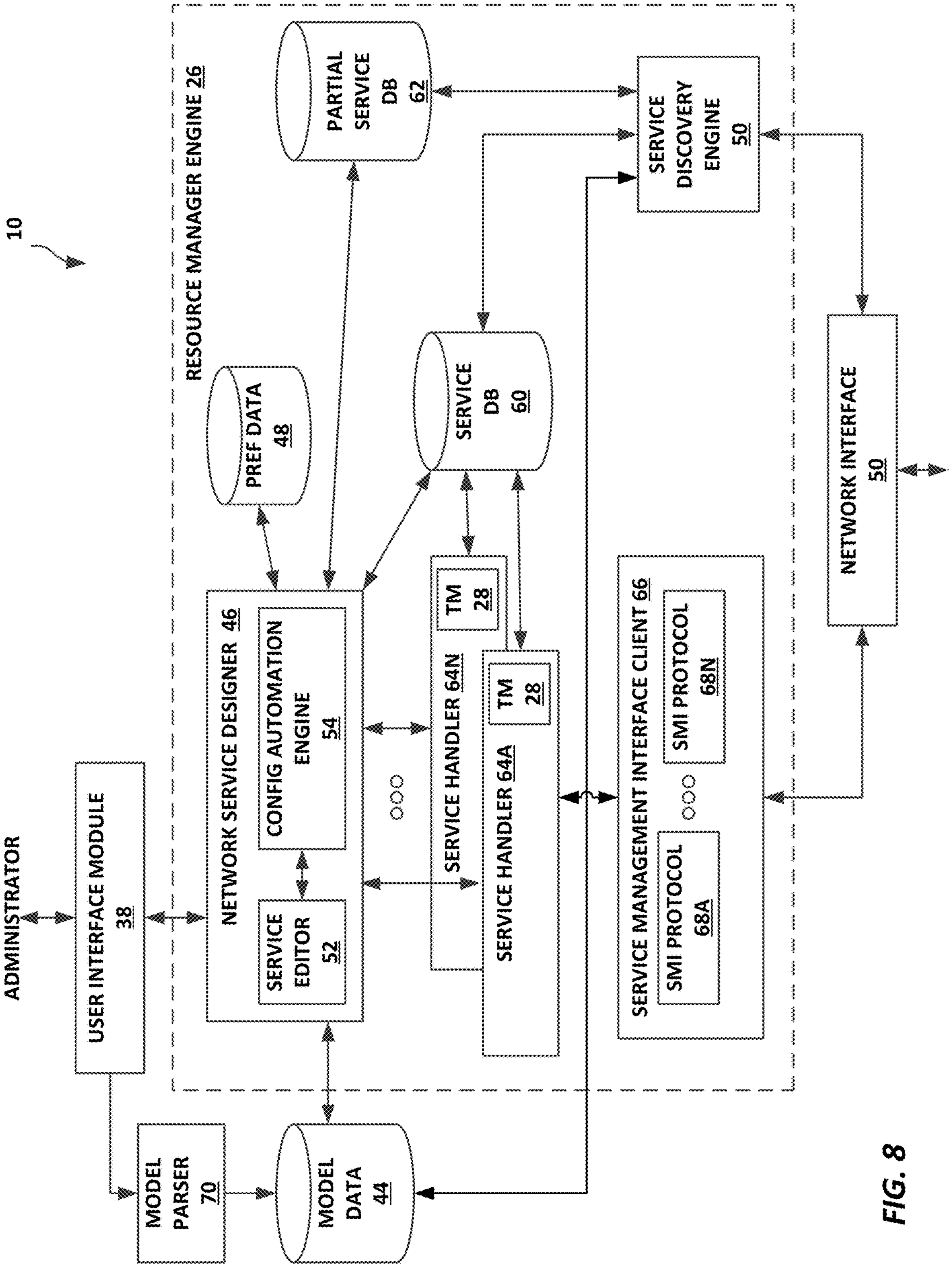
FIG. 8 is a block diagram illustrating an example network management system with a resource manager engine, in accordance with one or more aspects of the disclosure.

FIG. 8 is a block diagram illustrating an example network management system with a resource manager module, in accordance with one or more aspects of the disclosure. In one example approach, resource manager engine 26 includes a network service designer 46, a service discovery engine 50 and a service management interface client 66. Network service designer 46 includes a network service editor 52 connected to a configuration automation engine 54.

In one example approach, resource manager engine 26 includes a service discovery engine 50 capable of discovering existing network services and a network service designer 46 capable of creating new services and changing the configuration of existing network services. An administrator interacts with resource manager engine 26 via user interface module 38 to locally maintain and modify preference data store 48 and service database 60, and to convey changes in service configuration to the appropriate element(s) 5. In the example shown in FIG. 8, service discovery engine 50 receives an indication that one or more network devices have been added to network 2. Service discovery engine 50 characterizes each new network device based on its YANG device model and imports device configuration information from the network devices to determine the number and types of service instances existing in network 2 but unknown to NMS 10.

In the example shown in FIG. 8, network service designer 46 receives commands from user interface module 38 and generates a configuration service model from the service instance provided as device CLI commands. The generated configuration service model may then be used to create service instances. Network service designer 46 may also display configuration data back to an administrator through user interface module 38. In some example approaches, service configuration information may include schema read from model data storage 44, system preferences read from preference data store 48 or service configuration data read from service database 60. In the example shown in FIG. 8, network management system 10 includes a device model parser 70 used to create schemas to be stored in model data store 44. In some such example approaches, device model parser 70 converts device model information received from the manufacturer of a device to a schema associated with the device before storing the new schema in model data storage 44.

In some example operations, resource manager engine 26 receives service requests to validate, provision, and/or manage services provided by network 2. The service requests may be in the form of data-interchange formatted messages. In some example approaches, service requests arrive via one or more of network interface module 32 and user interface module 38. In some example approaches, for instance, resource manager engine 26 receives a service request message requesting network services at user interface module 38. In some examples, user interface module 38 is implemented in a stateless, client-server communications architecture. The stateless, client-server communications architecture may rely on a protocol that is cacheable. As an example, user interface module 38 may be implemented using a representational state transfer (REST) software architecture to send and receive messages seeking to validate, provision, and/or manage services provided by network 2. User interface module 38 may execute HTTP as an application protocol in some cases.

A service request may include a definition of one or more services and/or resources of a network that are being requested by a customer. As one example, a service request may specify a Virtual Private Network (VPN) service for a customer between one or more customer sites. In some example approaches, network management system 10 discovers network resources by means of routing protocols such as Interior Gateway Protocols (IGPs), as well as management protocols/methods such as NETCONF/YANG. In addition, in some example approaches, network management systems 10 discovers the network state by gathering load status, statistics, counters, alarms, and health indications using management methods such as NETCONF/YANG, Simple Network Management Protocol (SNMP), Transport Layer Interface (TLI), and/or Common Object Request Broker Architecture (CORBA).

In the example shown in FIG. 8, resource manager engine 26 includes one or more service handlers 64A-64N (collectively, "service handlers 64"), with each service handler capable of realizing the state of the network represented by the service request by configuring network elements 5 and gateways 8. In the example shown in FIG. 8, each service handler 64 includes a translation module 28. Service handlers 64 may use each translation module 28 to translate the high-level data model of the service abstraction defining the service into a lower level form suitable for interacting with network elements 5 and gateways 8 of network 2 as noted above. In one such example approach, this is a two-step process in which each translation module 28, first, translates the high-level configuration instructions to vendor-neutral configuration instructions. Translation module 28 then translates the vendor-neutral configuration instructions to low-level configuration instructions.

In one example approach, a resource manager engine 26 that receives the service request message may validate the service request included in the message and provision the service via service handlers 64 and service management interface client 66 if sufficient network resources exist to satisfy the service request. In this way, user interface module 38 and service handlers 64 may provide a flexible service abstraction layer for service designer modules 46 that can support fast-changing service types, adapt to real time network resources, and enforce business logic.

In some example approaches, service handlers 64 of resource manager engine 26 independently execute path computation algorithms to calculate paths and assign loads among network elements 5. Each of service handlers 64 may, for instance, represent a software process or process routine executed by a thread of a multi-threaded process that executes service handlers 64. In some instances, an administrator deploys multiple instances of resource manager engine 26, each of which may include two or more parallel instances of service handler 64.

In some examples, service handlers 64 of resource manager engine 26 independently and in some cases synchronously (i.e., at the same time) configure network 2 by issuing commands to elements of network 2 that include network elements 5 and gateways 8. The commands may, for instance, establish paths through network 2. For this purpose, the service handlers 64 may use routing protocols, signaling protocols such as Multiprotocol Label Switching (MPLS) Resource Reservation Protocol with Traffic Engineering extensions (RSVP-TE), Generalized MPLS, or configuration protocols such as NETCONF/Yang, SNMP, PCEP, or other protocols for installing state or otherwise controlling elements of network 2. In the example approach shown in FIG. 8, service provisioning may be provided by two or more service handlers operating in parallel under control of network service designer 46.

In some example approaches, user interface module 38 may be invoked by other network management systems 10 in a hierarchical arrangement of controllers or by an orchestrator, administrator, or other entity, to modify a configuration state in preference data store 48 or extract operational state of a service data model stored in service database 60. For example, user interface module 38 may be used for integration with an orchestration system such as OpenStack, may be used by an application such as an Operations Support Systems (OSS)/Business Support Systems (BSS), or may present a RESTful Application Programming Interface (API).

In some example approaches, each of service handlers 64 includes similar components to perform similar functionality, said components and functionality being described hereinafter with respect to service handler 64A. In some such example approaches, service database 60 stores service objects that represent instantiated services within a formal service data model. The high-level service model may include, e.g., a demand calendar and constraints upon the network directed by the provider/enterprise. Service handlers 64 transform the service objects in service database 60 from the high-level service data model to corresponding lower-level objects in a technology data model (using, for example, translation functions 30). In some example approaches, service handler 64 includes a schema transformer which takes schema from model data storage 44 and uses the schema to convert a service data model to a technology data model used to configure services associated with network elements 5 and gateways 8. Whereas the high-level service data model describes services previously requested and instantiated or being processed for eventual instantiation with the network segment under control of resource manager engine 26, the low-level technology data model describes how those services are implemented or are to be implemented within network 2.

In some example approaches, the technology data model is stored with the service data model in service database 60. The technology data model may include, for example, an object that describes a TE-LSP that at least partially implements a service in service database 60. In some example approaches, the technology data model further includes identifiers of network resources of the network managed by resource manager engine 26, such as network resources of service provider network 2. The technology data model may further include configuration state that describes respective configurations of the network elements as well as operational state that describes respective operational characteristics of the network elements, such as load, available bandwidth, etc.

In one example approach, a high-level service data model describes the desired state of the network under the control of resource manager engine 26 at a very high level of abstraction, using objects that map directly to services provided to end users—for example, a virtual network, a connectivity policy, or a security policy. A low-level technology data model, on the other hand, describes the desired state of the network at a very low level of abstraction, using objects that map to specific network protocol constructs such as a BGP route target or a VxLAN network identifier. Accordingly, in some example approaches, service management interface (SMI) client 66 executes one or more SMI protocols 68A-68K (collectively, "SMI protocols 68") to obtain configuration state and operational state from and inject configuration state and operational state into segments of network 2 under the control of resource manager engine 26.

In one example approach, configuration state and operational state are stored as objects intelligible to SMI protocols 68 and are mapped to constructs of SMI protocols 68. In this way, resource manager engine 26 makes the state of the network under control of resource manager engine 26 match the desired state of the network as configured via the user interface module 38 and as represented by the service data model.

In one example approach, SMI protocols 68 include protocols for path provisioning as well as for topology discovery. For example, SMI protocols 68 may include Path Computation Element (PCE) Communication Protocol (PCEP), Open Shortest Path First with Traffic Engineering extensions (OSPF-TE), Intermediate System to Intermediate System with Traffic Engineering extensions (ISIS-TE), BGP Link State (BGP-LS), NETCONF/Yang, Interface to the Routing System (I2RS) protocols, CLIs for the network elements, and SNMP.

Once service objects have been edited for certain properties, the "diff" for the objects may be generated. The diff may be, for example, Netconf-based. In one example approach, service handler 64 takes the diff for all the changes and merges them into service database 60 for deployment to managed elements 5, thereby facilitating single or bulk management of services deployed within a network.

As described above, resource manager engine 26 has access to schemas in model data storage 44. In one example approach, model data storage 44 includes a device—specific schema for each of the network elements 5 and gateways 8 managed by resource manager engine 26. Resource manager engine 26 uses known schemas (e.g., extensible markup language (XML) schemas typically in the form of XML Schema Definition (XSD) documents) that specify the proper means for interacting with and configuring network elements 5 and gateways 8 to manage policy configurations for network elements 5 and gateways 8. Further information on XML documents and XSD documents can be found in Extensible Markup Language (XML) 1.0 (Fifth Edition), W3C Recommendation 26 Nov. 2008, and XML Schema Part 1: Structures Second Edition, W3C Recommendation 28 Oct. 2004, respectively, the entire contents of both are incorporated herein by reference.

The schemas stored in model data storage 44 are typically supplied by the manufacturer of a managed device, such as one of network elements 5, and are generally stored as flat files or databases, though they may in some instances be stored as another data structure. In some example approaches, resource manager engine 26 obtains policy schemas from a remote storehouse, such as the Juniper Networks Schema Repository, a publicly accessible resource that is updated with each network device release. The Juniper Networks Schema Repository enables access to XSD and XML files defined for each network device, model, and software version. In such example approaches, resource manager engine 26 may cache a copy of the appropriate schemas for network elements 5 and gateways 8 within model data storage 44.

In general, an XML-based device schema for a managed device specifies appropriate syntactical structure for XML configuration files that, when produced by resource manager engine 26 in compliance with the schema, will be received and used by the corresponding managed device to configure the managed device. For example, a schema may be used to describe to network service editor 52 the elements and attributes that can properly be present within the XML configuration file for that configuration file to be considered valid for a given managed device in view of the specifications of the device, the functions provided by the device, the network requirements for configuration of the device such as an Internet protocol (IP) address and hostname for the device, and mechanisms by which resource manager engine 26 interacts with the managed device. In some example approaches, the elements and attributes are displayed to the administrator via user interface module 38 for review and validation.

FIG. 9 is a block diagram illustrating an example network service designer 46, in accordance with one or more aspects of the disclosure. In the example approach of FIG. 9, network service designer 46 includes a network service editor 52, a configuration automation engine 54 and a learning engine 56. In one example approach, configuration automation engine 54 may be triggered by various conditions. In one such example approach, configuration automation engine 54 responds to each trigger by 1) determining if the network is in a consistent state; 2) identifying corrective actions and ranking the corrective actions; and 3) automatically populating most of the attributes during remedial action. Corrective actions that are approved by the user or administrator and corrective actions that are rejected by the user or administrator are noted and used to train learning engine 56.

In one example approach, once network 2 is modeled, the entire network model is converted into a feature vector. In one example approach, the entire vendor neutral configuration model is converted into XPATHs; each XPATH is assigned an integer ID.

In one example approach, learning engine 56 in network service designer 46 receives as inputs a) the ID of current attribute XPATH, b) the computed position of the current attribute in the network model (i.e., whether it is a hardcoded mapping, a network level attribute, or an endpoint level attribute) and c) the entire vendor neutral model, where the XPATHs present in the current network model have value 1 and the other XPATHs have value 0. In one such example approach, learning engine 56 outputs where the attribute belongs, whether it is a hardcoded mapping, a network level attribute or an endpoint level attribute.

In one example approach, learning engine 56 is a multi-layer perceptron having four layers (an input layer, an output layer and two hidden layers. A multi-layer perceptron is a feedforward artificial neural network that maps sets of input data onto a set of outputs. Each layer is fully connected to the next layer. The perceptron learns by changing connection weights via backpropagation.

In one example approach, learning engine 56 uses GridsearchCV to tune perceptron parameters (like optimizer, loss function, batch size, epoch, etc) to get maximum accuracy. GridsearchCV basically runs learning over a range of given parameters and returns the parameters which give the maximum accuracy. In one example approach, a separate computing resource determines appropriate perceptron parameters based, for instance, on GridsearchCV.

In one example approach, all layers of the perceptron use 0.5 dropout and use categorical entropy as the loss function. Other values of dropout can be used as well, although values between 0.2 and 0.8 are most effective.

In one example approach, the neural network is trained using stochastic gradient descent, which is a stochastic approximation of the first-order iterative optimization gradient descent algorithm. The last layer of the perceptron uses the softmax function (or normalized exponential function) as an activation function. Such an approach has proven effective when applied, for instance to classification problems in the final layer of a neural network. Python machine learning libraries like Keras on top of Theano or Google TensorFlow may be used to obtain the softmax function.

In one example approach, learning engine 56 determines the type of attribute (hardcoded, service level or endpoint level) based on the current configuration attributes and the current attribute type. In one such example approach, configuration automation engine 54 feeds an identifier of the current attribute, a computed position of the current type of attribute (hardcoded, service level or endpoint level) and the network model feature vector. Learning engine 56 then determines where the attribute belongs, and whether it is a hardcoded mapping, a network level attribute or an endpoint attribute.

In one such approach, learning engine 56 includes a neural network having three layers used to select between hardcoded, service level or endpoint level. A dropout of 0.2 may be used on the input and output layers. GridsearchCV may be used to tune the parameters of the neural network to obtain maximum accuracy. GridsearchCV runs learning over a range of given parameters and returns the parameters for the neural network of learning engine 56 which give the maximum accuracy.

Figure 10:
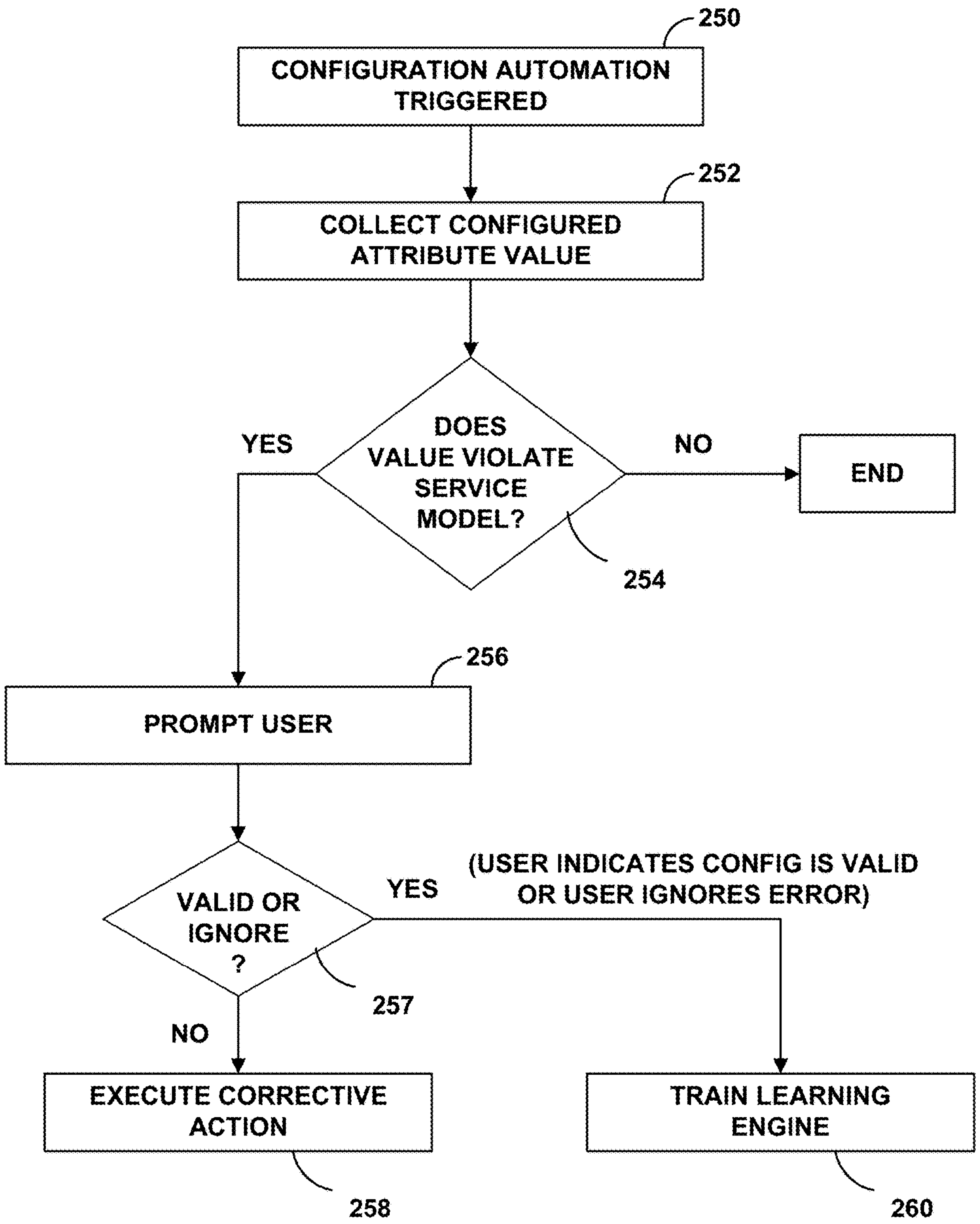
FIG. 10 is a flowchart illustrating configuration automation, in accordance with techniques of this disclosure.

FIG. 10 is a flowchart illustrating configuration automation, in accordance with techniques of this disclosure. Configuration automation is triggered at 250. In some example approaches, configuration automation engine 54 has a variety of different trigger points. In one example approach, configuration automation engine 54 is called from database triggers, which are invoked when a service in service database 60 changes. In some example approaches, configuration automation engine 54 is also triggered by activities in temporary databases that store service changes. In one example approach, configuration automation engine 54 is also triggered by tasks, such as, for example, service discovery, resynchronization of out-of-band changes, a configuration change made by system 10, a network fault, or when a device is deleted by system 10.

For service discovery, in one example approach, when a device is discovered, system 10 pulls information on the device's service/network model instances from the device and uses the information to populate service database 60 (252). After discovering the services, whether they are hidden or user-defined, if system 10 ends up creating a partial service instance, in one example approach, configuration automation engine 54 identifies and comes up with corrective actions as detailed below.

In one example approach, configuration automation engine 1) identifies if the network is in a consistent state after the trigger; 2) identifies corrective actions and ranks the corrective actions; and 3) automatically populates attributes during remedial actions. Possible corrective actions include a) delete the attribute/endpoint at issue; b) modify the attribute/endpoint at issue (system will populate attribute(s) with learned defaults); c) add an attribute/endpoint (system will populate attribute(s) with learned defaults). Note that all the three options above may not be always applicable. Also, an attribute may be a single attribute or a container/list/choice of attributes.

As noted above, in one example approach, configuration automation engine 54 automatically populates attributes during remedial actions. In one such example approach, configuration automation engine 54 sets attributes with learned defaults (resources like ports and connectivity attributes like virtual circuit IDs are auto-allocated); computes connectivity attributes from peers when auto-populating data for a network model instance (the remaining attributes are copied from devices found in the same category in the learning database); discovers device roles (devices are categorized based on the learning data; a learning engine will be fed with the device configurations and the device will be categorized into multiple roles); and discovers port types.

A network consistency check is made at 254 to determine if, for example, any of the attributes pulled from the device violate a service model. In one such approach, configuration automation engine 54 has a configuration preparation phase. If the perceived violation is, for example, during service discovery or 00B resync, engine 54 moves to 256 without taking any further action. If, however, the perceived violation is in a more critical area (such as device down or link down events), in one example approach engine 54 temporarily disables the corresponding configurations before moving to 256. Automation engine 54 then replaces the disabled endpoint with a new endpoint as part of the corrective action at 258.

At 256, network service designer 46 prompts the administrator or user to determine if the service model violation is valid. If the configuration is valid (i.e., not a violation), the user marks the violation as "ignore" and moves to 257. At 257, a check is made to determine if the user indicated that the current configuration is either valid or can be ignored. If so, at 260, engine 54 trains learning engine 56 to ignore similar violations in the future. If, however, the configuration is not valid (i.e., it is a violation) and cannot be ignored, the user takes corrective action at 258. In some example approaches, the user simply asks system 10 to execute corrective action.

In one example approach, the user prompt at 256 includes a proposed list of possible corrective actions and the user selects one or more corrective actions from the list. In one such example approach, learning engine 56 is then trained to move the selected corrective action to the top of the list the next time the violation is detected, or to automatically apply the corrective action. In one example approach, the user selects whether to automatically apply the corrective action to such a violation in the future. In one example approach, attribute suggestions that violate hidden/user-defined services are removed before the suggestions are displayed to the user at 256.

In one example approach, the configuration automation engine framework allows additional logic to be plugged in as part of 254. For example, as a follow-up to a threshold alarm indicating high load on a service endpoint, the system may add an empty endpoint to the service and trigger configuration automation. Configuration automation engine then fills in values for all the mandatory attributes and posts the changes for user review, if necessary (at 256).

In one example approach, configuration automation engine 54 allocates resources automatically. For instance, engine 54 attempts to set learned defaults during the corrective action step (at 258). In one such example approach, the values for resources are auto-filled by engine 54 based on, for instance, values stored in model data store 44, preference data store 48, or service database 60. For other attributes, the defaults are fetched from, for instance, learning engine 56. In one example approach, attribute values are saved in learning engine 56 in the context of the devices and ports in the endpoints. When similar devices/ports are allocated to the service during corrective action, then the default values for the non-resource attributes are fetched from these learning engines 56. In one such example approach, the values of the attributes from devices with the similar roles and configurations are copied. For externally mapped attributes, values are read from the neighbor device.

Corrective action in system 10 can take many forms. For instance, if a mandatory attribute is missing in the network model, engine 54 attempts to configure the missing attribute in the service. The attribute may be a leaf or may be a complex attribute, like a container/list (e.g., an endpoint may be missing). In the case of the missing endpoint, in one example approach, engine 54 configures the endpoint on an existing device. Such an approach also auto populates the device and interfaces.

In one example approach, when an externally mapped attribute, like BGP neighbor, is configured with an IP address and the IP address is not found in any of the existing devices in the system, automation engine 54 suggests that the user discover the device with the given IP address configured on one of its interfaces. In one such example approach, engine 54 includes an interface used to plug in additional corrective actions such as these.

In one example approach, when the user chooses some corrective action at 256, the configuration pushed as part of the fix will be annotated with a changes type such as, for example, network event fix, network expansion support, etc. This information adds semantic value to the configurations and is used, in some example approaches to improve the accuracy of learning engines 56.

In one example approach, user interface module 38 includes a graphical user interface that dynamically generates a list of corrective actions for display to the user at 256. In one such approach, the user, when prompted to review a misconfiguration identified by system 10 at 256, can choose to: a) fix the configuration error; b) ignore the configuration error for now; or mark the configuration as valid. Other options are contemplated as well.

Figure 11:
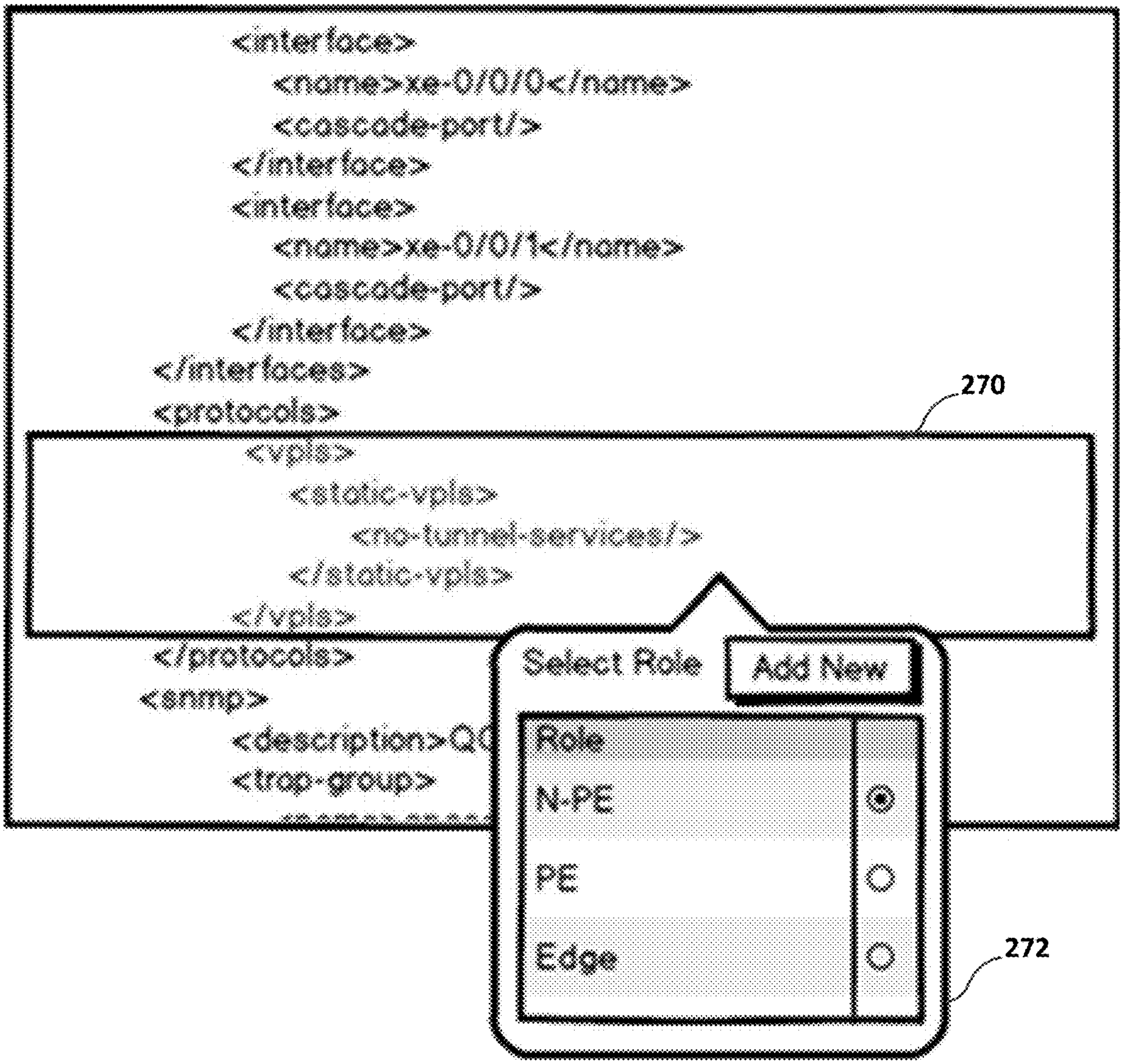
FIG. 11 illustrates a graphical user interface used to select one or more roles for a device, in accordance with techniques of this disclosure.

Device role discovery will be discussed next. FIG. 11 illustrates a graphical user interface used to select one or more roles for a device, in accordance with techniques of this disclosure. In one example approach, when a device is discovered, system 10 prompts the user to identify the roles the device plays in the network. The same device can play more than one role. In one example approach, the user, as part of the process of identifying roles associated with a device, explains to learning engine 56 how he or she arrived at the roles selected. In one such example approach, roles are assigned based on the configuration found on the device. So, while identifying a role, the user also provides the configuration segments based on which he found the role for the device. For example, a device may be a P2P peer if it has MPLS configured. So, in one example approach, user interface module 38 displays, under engine 54 control, configuration segments 270 associated with the device to the user (via, for example, graphical user interface 272). The user then selects the configuration segment containing the MPLS configuration, when he or she marks the device as a P2P peer. A device learning module in learning engine 56 is then trained with the user inputs from the above step. In one example approach, learning engine 56 is pre-trained to perform service, role and input type discovery and is shipped with service models, with multiple device roles and with multiple input types.

In one approach, learning engine 56 includes a neural network used to discover one or more device roles for each device discovered on network 2. In one such approach, the device configuration is split into segments (each list entry becomes a segment for example) and only the segments chosen by the user are taken and fed to the learning model in learning engine 56. In one example approach, a user can select no more than ten segments, so, the input sequence length is 10. When the sequence length is less than 10, the sequence is padded with zeros.

In one example approach, the number of samples used to train learning engine 56 to perform role discovery is 50,000. Additional samples can be easily auto-generated, using the following approach:

1) Let the user select the segments and device role.
2) On submit, prompt the user to review the existing devices found with the role.
3) Also, auto-generate combinations of segments attached to different existing device roles with the new device role and create new samples.

In one example approach, learning engine 56 includes a recurrent neural network having two layers: one Long Short-term Memory (LSTM) layer and one Dense layer with sigmoid activation function. The optimizer uses a stochastic gradient descent with, for example, learning rate 0.001 and clip norm 1.0. A dropout of 0.2 may be used on the input and output layers. GridsearchCV may be used to tune the parameters of the neural network to obtain maximum accuracy. GridsearchCV runs learning over a range of given parameters and returns the parameters for the neural network of learning engine 56 which give the maximum accuracy.

In one example approach, the configuration found on each discovered device is split into configuration segments, based on the vendor neutral yang schema. Every module, submodule, container, list entry and choice case becomes a segment. In one such example approach, segments are hierarchical, like files and folders. The user selects one or more of these segments 270, while tagging a device with a role 272. Learning engine 56 is then trained with this information. In one example approach, the same technique is used to determine interface types. In one example approach, learning engine 56 is a recurrent neural network such as described above. The result is a classification, where multiple output nodes can be activated, with each output node indicating a device role. The use of recurrent layers in a neural network is described at http://keras.io/lavers/recurrent/, the description of which is incorporated herein by reference.

Figure 13:
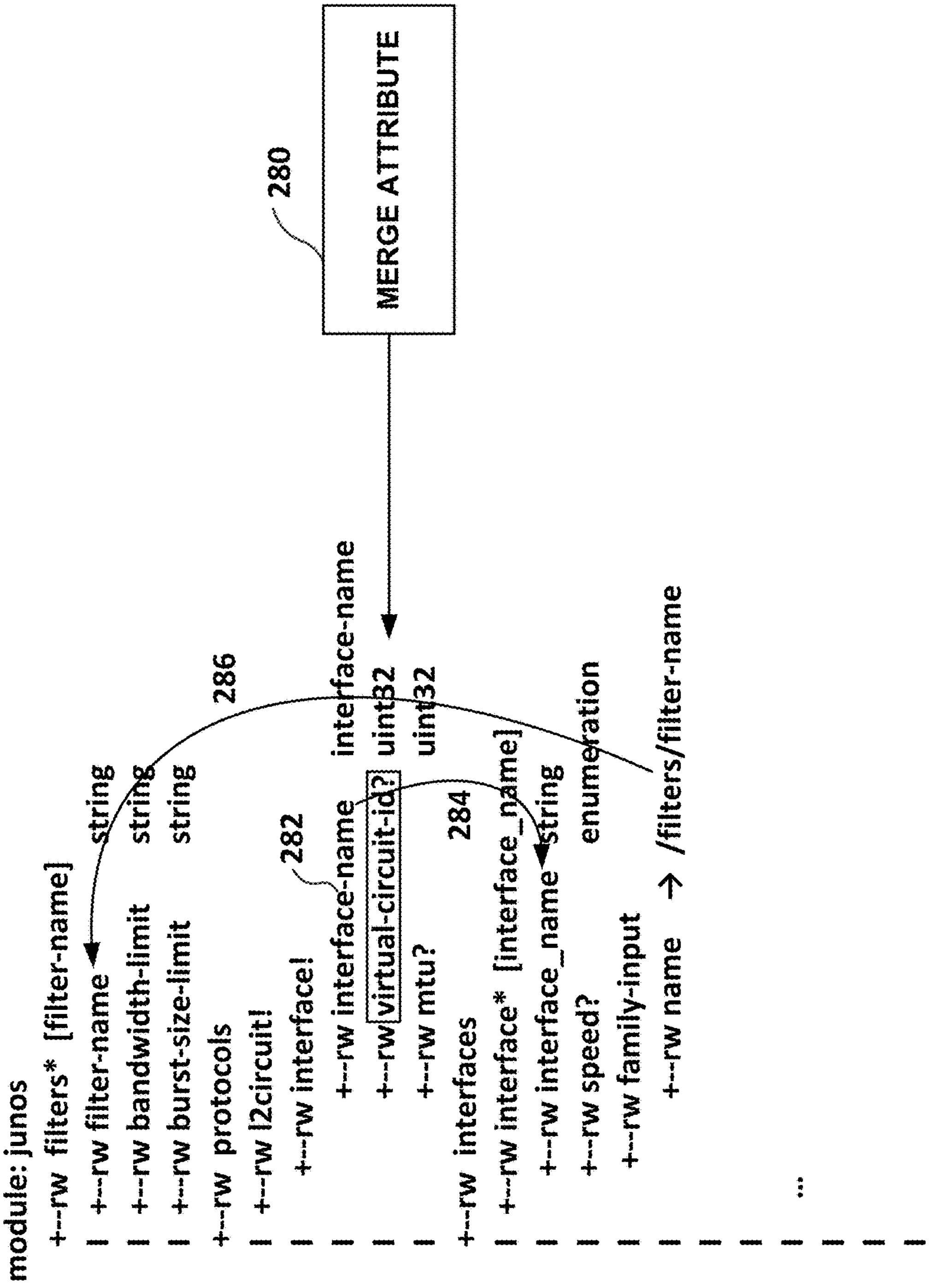
FIG. 13 illustrates a method of generating a dependency graph, in accordance with techniques of this disclosure.

An example will be discussed next in the context of FIGS. 12-15. FIG. 12 illustrates a vendor neutral configuration model. FIG. 13 illustrates a method of generating a dependency graph, in accordance with techniques of this disclosure. In the example approach of FIG. 13, the dependency graph is generated for merge attribute 'virtual-circuit-id' 280 as discussed in FIG. 7. As can be seen in FIG. 13, 'interface-name' is located in 'protocols/12circuit/interface.' Merge attribute 280 is also part of the mapping. Therefore, 'interface-name' is added as a neighbor of merge attribute 'virtual-circuit-id' in the dependency graph (282).

As can be seen in FIG. 13, 'interfaces/interface/interface-name' is a leafref of 'protocols/12circuit/interface'. So 'interface-name' is added as a neighbor of 'interfaces/interface/interface-name' (284). Finally, 'interfaces/interface*/family-input/filter-name' is a 'leafref of filters*/filter-name' (286). Thus, by tracing the leafrefs and containment hierarchy in the yang, the configuration segments for filters, L2circuits and interfaces are included in the created network model.

Figure 14:
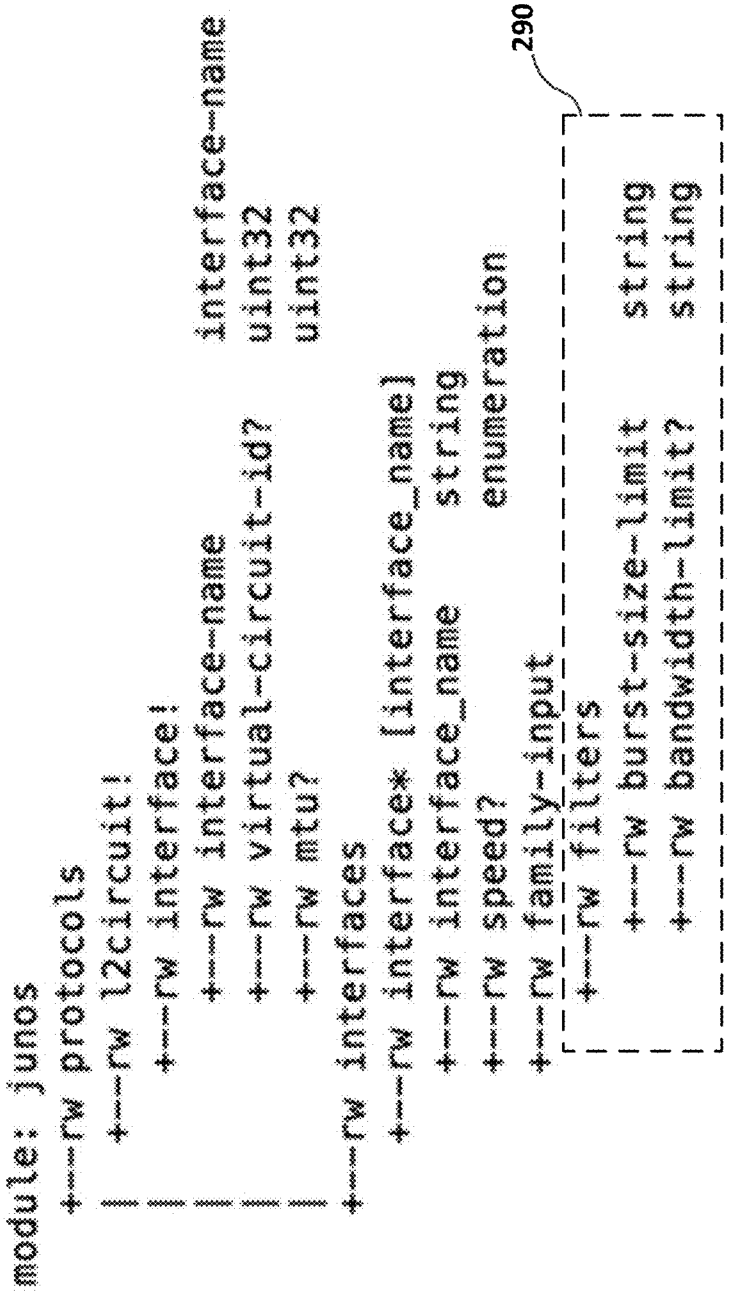
FIG. 14 illustrates resolving the leaf references, in accordance with techniques of this disclosure.

FIG. 14 illustrates resolving the leaf references, in accordance with techniques of this disclosure. In the example shown in FIG. 14, the leaf reference for 'interfaces/interface*/family-input/filter-name' has been resolved by replacing the leaf reference with the parameters 290 to which the leaf reference referred.

FIG. 15 illustrates grouping of a device configuration at the service level and at the endpoint level, in accordance with techniques of this disclosure. In one example approach, a fully-trained learning engine 56 under control of network service designer 46 groups the configurations at the service level (302) and at the endpoint level (304) as shown in FIG. 15. Each network model has a unique identifier 300, i.e., the type of the network instance, which is maintained in service database 60. This is identifier can be a string, which indicates the service type, in case the service is user-defined.

As noted above, when a device (e.g., device A) is first discovered in network 2, configuration automation engine 54, through network service designer 46, suggests to the user that the user add another device (e.g., device B) as an endpoint. In one example approach, configuration automation engine 54 also lists similar devices based on the learned device roles. In one such example approach, configuration automation engine also provides an option so that the user can add new device credentials to help discover the device. If the user chooses an existing device in the system, then the network model instance for the existing device is configured on the selected device. For instance, if the first device had burst-size-limit of 20 and the second device has 30, configuration automation engine 54 prompts the user to change the burst-size-limit in one of the endpoints. In one example approach, engine 54 also displays, as part of the prompt, a learned default for the burst-size-limit field of the selected device that may be inferred from similar devices of the same type of network model.

The techniques used for service discovery may also be used in configuration management. In one example approach, when a configuration change happens or on receiving a network event, system 10 validates the current configuration and suggests corrective actions, if needed. In one such example approach, system 10 performs one or more of: comparing service level attributes of endpoints to make sure they are the same, providing suggestions for appropriate values of the service level attributes, and determining if network will be in a consistent state after the change is implemented. In one example approach, system 10 uses a configuration automation engine (such as configuration automation engine 54) to populate configuration attributes in network service models automatically based on historical configuration. In one such example approach, machine learning is used to configure attributes with learned defaults during configuration automation. For instance, in some example approaches, configuration automation engine 54 suggests default values for non-resource attributes based on values in similar service models (i.e., the values of the same attributes from devices with similar roles and configurations are copied), while, in some example approaches, configuration automation engine 54 suggests default values for externally mapped attributes by reading the values used in one or more neighboring devices.

As in the service discovery approach discussed above, in some example approaches, configuration automation engine 54 relies on machine learning and the additional validations provided via "service abstraction." In one such example approach, machine learning is used to perform one or more of: suggesting default values for non-resource attributes based on values in similar service models and suggesting default values for externally mapped attributes by reading the values used in one or more neighboring devices. In one example approach network management system 10 includes a learning system (such as learning engine 56); system 10, therefore, learns from user suggestions and corrections.

Figure 16:
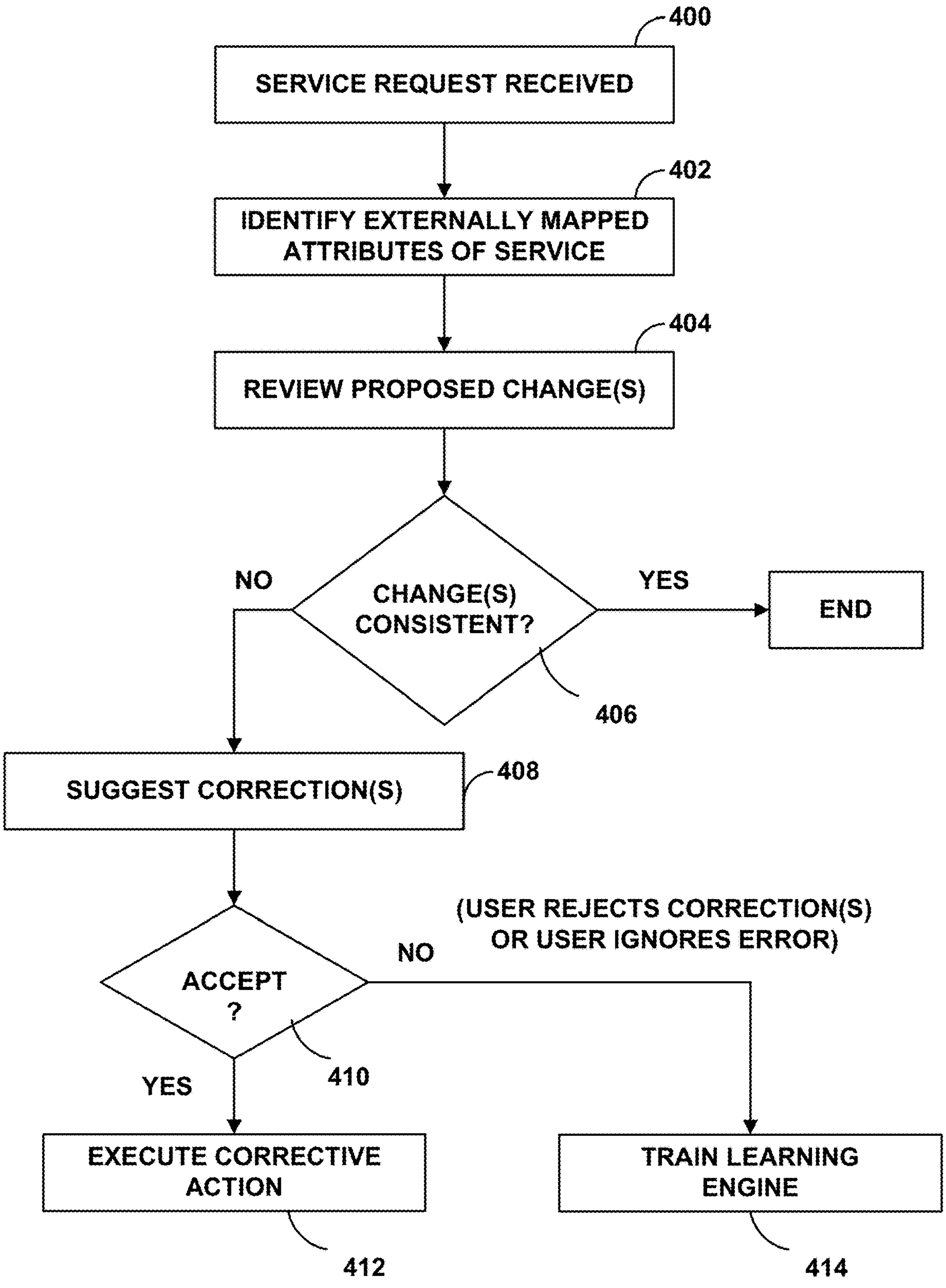
FIG. 16 is a flowchart illustrating an example technique for network services configuration management, in accordance with aspects of the disclosure.

FIG. 16 is a flowchart illustrating an example technique for network services configuration management, in accordance with aspects of the disclosure. In the example approach of FIG. 16, system 10 receives a service request (400). The service request includes service configuration information associated with a network service. System 10 determines attributes of the network service (402). Determining attributes of the network service includes identifying externally mapped attributes associated with the network service. System 10 reviews the proposed changes, the configuration information and the underlying network services (404). System 10 then validates the service configuration changes against the externally mapped attributes of the network service to determine if the changes are consistent with the network model (406). In one such approach, system 10 compares the service configuration information for the externally mapped attributes to expected values of the externally mapped attributes of similar network services, and generates a validation error if values for the externally mapped attributes are not within a range of the expected values, before moving to 408. In one example approach, this means that, for every service configuration change, the automation engine checks if the service level attributes of the network services contain the same values across service endpoints. If that is not the case, then appropriate corrective actions are applied.

In another example approach, for device configurations which are not part of any of the user-created service types, system 10 creates its own service definitions and keeps those service definitions hidden from the user. These system-created service instances are called termed "hidden network instances." Again, as in above, when a change is made in a service configuration for one of these hidden network instances, the automation engine checks if the service level attributes contain the same values across service endpoints. If that is not the case, then appropriate corrective actions are applied.

In the approach shown in FIG. 16, system 10 suggests corrections (408). The user is offered an opportunity to accept or reject one or more of the suggested corrections (410). If accepted, system 10 executes the corrective action (412). If not accepted (i.e., the user rejects the corrections, or ignores the reported error), system 10 updates learning engine 56 based on the user's actions and records the reason why, if given (414).

FIGS. 17A and 17B illustrate configuration information for two endpoint devices. As can be seen in FIG. 17A, device A has a configuration 310. Configuration 310 includes service level attributes (shown in italics) and endpoint level attributes (in bold). As can be seen in FIG. 17B, device B has a configuration 312. Configuration 312 includes service level attributes (shown in italics) and endpoint level attributes (in bold).

In one example approach, a user edits MTU on device B out-of-band. In one such example approach, a user would enter set protocols 12circuit interface ge-0/0/4 mtu 2522 to change the MTU of device B. Since service/connectivity-settings 302 of FIG. 15 is a YANG container, however, it cannot have two different values for the attribute service/connectivity-settings/protocols/12circuit/interface/mtu. In the example shown in FIGS. 17A and 17B, the MTU for both device A and device B already has the value of 1522. Now a new value of 2522 is being set for this attribute on device B. This value should either be copied to device A or this change should be rejected. In one example approach, the user is prompted with the two options mentioned above. Furthermore, in one example approach, the default value may be set to one of the two values, which is common in other devices with the same roles.

The techniques used for service discovery and configuration management may also be used in exception recovery. In one example approach, on receiving a network event, system 10 validates the current configuration and suggests corrective actions, if needed. Again, system 10 may, in some example approaches, rely on machine learning to suggest values for attributes, to discover device roles and to determine interface types. In one example approach, in case of device down or link down events, the corresponding network service model configurations are temporarily disabled. The automation engine 54 then may, for example, replace the disabled endpoint with a new one. In one example approach, system 10 performs one or more of: comparing service level attributes of endpoints to make sure they are the same, providing suggestions for appropriate values of the service level attributes, and determining if the network will be in a consistent state after making the suggested changes.

In one example approach, in case of threshold events (such as a high load on a service endpoint), the automation engine 54 adds an empty endpoint to the service and triggers configuration automation. The configuration automation engine 54 then fills in values for all the mandatory attributes and posts the changes for user review.

As in the service discovery and configuration management approaches discussed above, in some example approaches, configuration automation engine 54 relies on machine learning and the additional validations provided via "service abstraction." In one such example approach, machine learning is used to perform one or more of: comparing service level attributes of endpoints to make sure they are the same, providing suggestions for appropriate values of the service level attributes, and determining if the network will be in a consistent state after making the suggested changes. In one example approach, network management system 10 includes a learning system (such as learning engine 56); system 10, therefore, learns from user suggestions and corrections.

Figure 18:
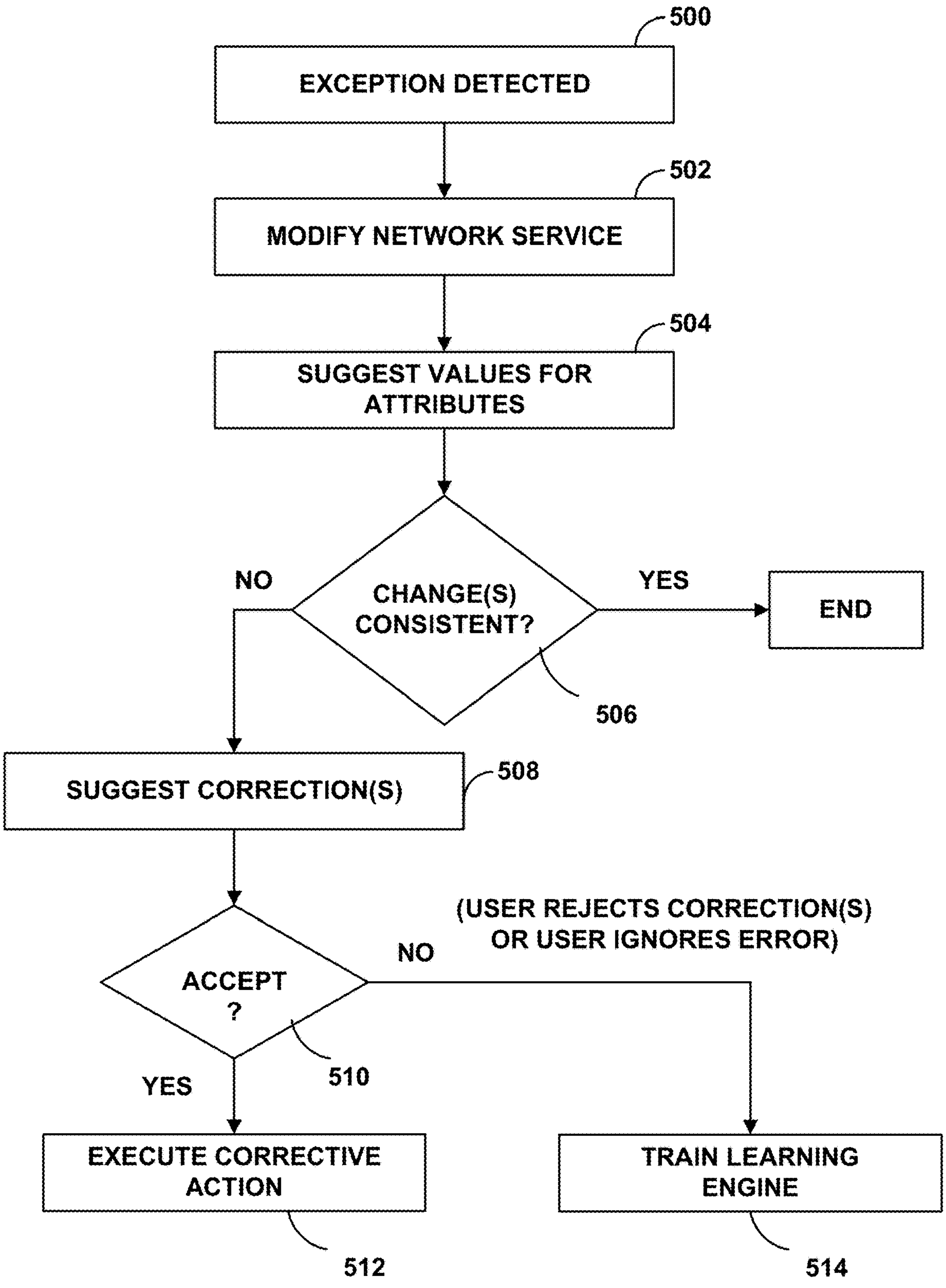
FIG. 18 is a flowchart illustrating an example technique for intelligent exception recovery of network services, in accordance with aspects of the disclosure.

FIG. 18 is a flowchart illustrating an example technique for intelligent exception recovery of network services, in accordance with aspects of the disclosure. In the example approach of FIG. 18, system 10 detects an exception in a network service (500) and modifies the network service in response to the exception (502). In some example approaches, modifying the network service ranges includes modifications such as modifying parameters of the network service in response to detecting, for example, that a service parameter is outside a threshold value, adding a network service in parallel to the existing network service to increase throughput, and replacing the network service with a different network service. In some example approaches, configuration automation engine 54 suggests values to be stored as externally mapped attributes of the new or modified network service or services (504). In one example approach, determining attributes of the network service includes identifying externally mapped attributes associated with the network service.

System 10 then validates the service configuration changes against the externally mapped attributes of the network service to determine if the changes are consistent with expected changes (506). In one such approach, system 10 compares the service configuration information for the externally mapped attributes to expected values of the externally mapped attributes of similar network services, and generates a validation error if values for the externally mapped attributes are not as expected, before moving to 508. In one example approach, this means that, for every service configuration change, the configuration automation engine 54 checks to determine if the service level attributes of the network service contain the same values across service endpoints. If that is not the case, then appropriate corrective actions are applied.

In the approach shown in FIG. 18, configuration automation engine 54 suggests the corrections (508). For instance, in one example approach, configuration automation engine 54, for every service configuration change, checks to determine if the service level attributes contain the same values across service endpoints. If that is not the case, then configuration automation engine suggests values for the service endpoints to resolve this issue. The user is offered an opportunity to accept or reject one or more of the suggested corrections (510). If accepted, system 10 executes the corrective action (512). If not accepted (i.e., the user rejects the corrections, or ignores the reported error), system 10 updates learning engine 56 based on the user's actions and records the reason why, if given (514).

What has been described are systems and methods for service discovery, for network service configuration management, and for exception recovery, all based on machine learning of acceptable underlying configurations of network services.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

The invention claimed is:

1. A method of recognizing device roles in a network device, the method comprising:

configuring a learning module to include a learning model, the learning model trained to associate configuration segments for each of a plurality of network devices with device roles performed by the network devices;

discovering a network service on a network;

receiving configuration information from the discovered network service;

splitting the configuration information received from the discovered network service into configuration segments based on a vendor neutral yang model, wherein the vendor neutral yang model is associated with the discovered network service; and determining if the discovered network service performs one or more of the device roles performed by the network devices used to train the learning model, wherein determining includes applying the learning model to the configuration segments of the discovered network service.

2. The method of claim 1, wherein determining if the discovered network service performs one or more of the device roles performed by the network devices used to train the learning model further includes identifying configuration segments associated with each of the one or more device roles performed by the discovered network service.

3. The method of claim 1, wherein configuring the learning module includes modifying the learning model when a user corrects an association, made by the learning model, of one of the configuration segments with one of the device roles.

4. The method of claim 1, wherein configuring the learning module includes:

receiving configuration information from a sample network device;

splitting the configuration information received from the sample network device into the configuration segments based on the vendor neutral yang model, wherein the vendor neutral yang model is further associated with one or more network services provided by the sample network device;

displaying the configuration segments to a user via a user interface; and receiving, from the user, an indication of device roles performed by the sample network device and an indication of the configuration segments associated with each device role.

5. The method of claim 4, wherein configuring the learning module further includes training the learning model based on the indication of device roles performed by the sample network device.

6. The method of claim 4, wherein configuring the learning module further includes training the learning model based on the indication of device roles performed by the sample network device and based on the configuration segments associated with each device role.

7. The method of claim 1, wherein configuring the learning module includes:

identifying network devices having a selected device role;

receiving configuration information for each of the identified network devices;

splitting the configuration information received for each network device found with the selected device role into configuration segments for each network device found with the selected device role, the splitting based on the vendor neutral yang model, wherein the vendor neutral yang model is further associated with each network device found with the selected device role; and receiving, from the user and for each network device found with the selected device role, an indication of the configuration segments associated with the selected device role.

8. The method of claim 7, wherein identifying network devices having a selected device role includes receiving, via a user interface, a user input indicating the selected device role.

9. The method of claim 1, wherein configuring the learning module includes:

receiving, via a user interface, a user input indicating selection of a device role;

identifying network devices having the selected device role;

receiving configuration information for each of the identified network devices;

splitting the configuration information received for each of the identified network devices into configuration segments for of the identified network devices, the splitting based on the vendor neutral yang model, wherein the vendor neutral yang model is further associated with each of the identified network devices; and displaying to a user a list of the identified network devices, wherein the list includes a listing, for each network device listed, of configuration segments that are associated with the selected device role.

10. The method of claim 9, wherein configuring the learning module further includes receiving, via the user interface, a user input indicating a correction to the configuration segments associated with the selected device role for one or more of the listed network devices.

11. The method of claim 1, wherein configuring the learning module includes:

receiving, via a user interface, a user input indicating selection of a device role and of one or more configuration segments associated with the selected device role;

identifying network devices having the selected device role;

receiving configuration information for each of the identified network devices;

splitting the configuration information received for each of the identified network devices into configuration segments for each of the identified network devices, the splitting based on the vendor neutral yang model, wherein the vendor neutral yang model is further associated with each of the identified network devices; and displaying to a user a list of the identified network devices, wherein the list includes a listing, for each network device listed, of configuration segments that are associated with the selected device role, wherein the listing is based, at least in part, on the configuration segments selected via the user interface.

12. The method of claim 11, wherein configuring the learning module further includes receiving, via the user interface, a user input indicating a correction to the configuration segments associated with the selected device role for one or more of the listed network devices.

13. A network management system, comprising:

a network interface;

memory; and one or more processors connected to the memory, wherein the memory includes instructions that, when executed by the one or more processors, cause the network management system to:

configure a learning module to include a learning model, the learning model trained to associate configuration segments for each of a plurality of network devices with device roles performed by the network devices;

discover a network service on a network;

receive configuration information from the discovered network service via the network interface;

split the configuration information read from the discovered network service into configuration segments based on a vendor neutral yang model, wherein the vendor neutral yang model is associated with the discovered network service; and determine if the discovered network service performs one or more of the device roles performed by the network devices used to train the learning model, wherein determining includes applying the learning model to the configuration segments of the discovered network service.

14. The system of claim 13, wherein the instructions that, when executed by the one or more processors, cause the network management system to determine if the discovered network service performs one or more of the device roles performed by the network devices used to train the learning model further include instructions that, when executed by the one or more processors, cause the network management system to identify configuration segments associated with each of the one or more device roles performed by the discovered network service.

15. The system of claim 13, wherein the instructions that, when executed by the one or more processors, cause the network management system to configure a learning module further include instructions that, when executed by the one or more processors, cause the network management system to modify the learning model when a user corrects a device role configuration segment association made by the learning module applying the learning model.

16. The system of claim 13, wherein the instructions that, when executed by the one or more processors, cause the network management system to configure a learning module further include instructions that, when executed by the one or more processors, cause the network management system to modify the learning model in response to a correction received from a user.

17. A method of recognizing interface types in a network device, the method comprising:

configuring a learning module to include a learning model, the learning model trained to associate configuration segments for each of a plurality of network devices with interface types provided by the network devices;

discovering a network service on a network;

receive configuration information from the discovered network service;

splitting the configuration information received from the discovered network service into configuration segments based on a vendor neutral yang model, wherein the vendor neutral yang model is associated with the discovered network service; and determining the interface types associated with the discovered network service, wherein determining includes applying the learning model to the configuration segments of the discovered network service.

18. The method of claim 17, wherein configuring the learning module includes modifying the learning model when a user corrects an association, made by the learning model, of one of the configuration segments with one of the interface types.

19. The method of claim 17, wherein configuring the learning module includes:

receiving configuration information from a sample network device;

splitting the configuration information received from the sample network device into configuration segments based on the vendor neutral yang model, wherein the vendor neutral yang model is further associated with one or more network services provided by the sample network device;

displaying the configuration segments to a user via a user interface; and receiving, from the user, an indication of interface types provided by the sample network device and an indication of the configuration segments associated with each of the interface types.

20. The method of claim 17, wherein determining the interface types further includes identifying configuration segments associated with each of the interface types.

* * * * *